US012598116B2

(12) United States Patent
Chaganti et al.

(10) Patent No.: US 12,598,116 B2
(45) Date of Patent: Apr. 7, 2026

(54) SMART INFRASTRUCTURE ORCHESTRATION AND MANAGEMENT

(71) Applicant: Dell Products L.P., Round Rock, TX (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 18/443,719

(22) Filed: Feb. 16, 2024

(65) Prior Publication Data

US 2025/0267082 A1 Aug. 21, 2025

(51) Int. Cl.
*H04L 41/5054* (2022.01)

(52) U.S. Cl.
CPC ................................ *H04L 41/5054* (2013.01)

(58) Field of Classification Search
CPC .................................................. H04L 41/5054
USPC ........................................................ 709/226
See application file for complete search history.

(56) References Cited

U.S. PATENT DOCUMENTS

| | | | | |
|---|---|---|---|---|
| 6,892,228 B1 * | 5/2005 | Penders | .............. | H04L 41/5054 |
| | | | | 717/109 |
| 7,543,060 B2 * | 6/2009 | Ishida | ................. | H04L 67/1023 |
| | | | | 709/224 |

| | | | | |
|---|---|---|---|---|
| 7,844,766 B1 * | 11/2010 | Straitiff | ............... | H04L 41/5054 |
| | | | | 717/172 |
| 7,912,955 B1 * | 3/2011 | Machiraju | ............. | G06F 9/5077 |
| | | | | 709/221 |
| 8,135,835 B2 * | 3/2012 | Wilbrink | ................. | H04L 67/56 |
| | | | | 709/226 |
| 8,185,908 B2 * | 5/2012 | Taniguchi | ............. | G06F 9/5038 |
| | | | | 718/103 |
| 8,880,674 B2 * | 11/2014 | Rao | .......................... | H04L 67/10 |
| | | | | 709/224 |
| 9,397,884 B2 * | 7/2016 | Chatterjee | ........... | H04L 41/5064 |
| 9,411,393 B2 | 8/2016 | Jackson | | |
| 9,495,137 B1 * | 11/2016 | Coetzee | ................ | G06F 8/4441 |
| 9,612,890 B2 * | 4/2017 | Chen | ..................... | G06F 11/008 |
| 9,740,596 B1 * | 8/2017 | Galburt | .............. | G06F 11/3688 |
| 9,921,633 B2 | 3/2018 | Bodas et al. | | |

(Continued)

FOREIGN PATENT DOCUMENTS

AU 2015221448 A1 * 2/2016 ............. H04L 41/12

*Primary Examiner* — Anthony Mejia
(74) *Attorney, Agent, or Firm* — WOMBLE BOND DICKINSON (US) LLP

(57) ABSTRACT

Methods and systems for managing service deployment are disclosed. To deploy services, dependencies and other characteristics (such as context data, capability data, placement rules, and workflow data) of services and the infrastructure boundaries in which the services are running may be dynamically collected, analyzed and updated. By dynamically analyzing dependencies and other characteristics (such as context data, capability data, placement rules, and workflow data) of services and the infrastructure boundaries, efficiency of use of computing resources may be improved by recycling existing workflow; statically defined operations and hard-coded conditional logic of services may also be avoided each time an environment in which the services are running has changed.

20 Claims, 18 Drawing Sheets

(56) References Cited

U.S. PATENT DOCUMENTS

| 10,142,174 | B2* | 11/2018 | Yang | H04L 67/62 |
|---|---|---|---|---|
| 10,491,704 | B2* | 11/2019 | Barrows | H04L 67/51 |
| 10,521,746 | B2* | 12/2019 | Seetharam | G06Q 10/06316 |
| 11,061,737 | B2* | 7/2021 | Dimitrov | G06F 9/455 |
| 11,481,263 | B2* | 10/2022 | Lowin | G06F 9/547 |
| 11,689,578 | B2* | 6/2023 | Sharma | H04L 41/5054 |
| | | | | 726/1 |
| 11,729,440 | B2 | 8/2023 | Butler et al. | |
| 11,924,066 | B2* | 3/2024 | Welch | H04L 67/10 |
| 2014/0075027 | A1* | 3/2014 | Chatterjee | H04L 67/10 |
| | | | | 709/225 |
| 2014/0344425 | A1 | 11/2014 | Varney | |
| 2016/0239578 | A1 | 8/2016 | Evans | |
| 2017/0142189 | A1 | 5/2017 | Cabrera | |
| 2018/0097889 | A1 | 4/2018 | D'Agostino | |
| 2019/0166209 | A1 | 5/2019 | Mueller | |
| 2020/0136930 | A1* | 4/2020 | Szulman | H04L 41/5096 |
| 2020/0259722 | A1* | 8/2020 | Kocberber | G06F 11/3409 |
| 2021/0014275 | A1 | 1/2021 | Martinez et al. | |
| 2021/0397476 | A1 | 12/2021 | Liu et al. | |
| 2022/0116455 | A1* | 4/2022 | Raghunath | G06F 21/577 |
| 2023/0198959 | A1 | 6/2023 | Martinez-Spessot | |
| 2023/0214925 | A1* | 7/2023 | Cella | G06Q 30/06 |
| | | | | 705/37 |
| 2024/0127151 | A1* | 4/2024 | Bradbury | G06Q 10/0633 |
| 2025/0036684 | A1* | 1/2025 | Lee | H04L 41/082 |
| 2025/0111246 | A1* | 4/2025 | Casini | G06N 5/02 |
| 2025/0267082 | A1* | 8/2025 | Chaganti | H04L 41/5054 |
| 2025/0267083 | A1* | 8/2025 | Chaganti | H04L 41/5054 |
| 2025/0272124 | A1* | 8/2025 | Chhimpa | G06F 9/455 |

* cited by examiner

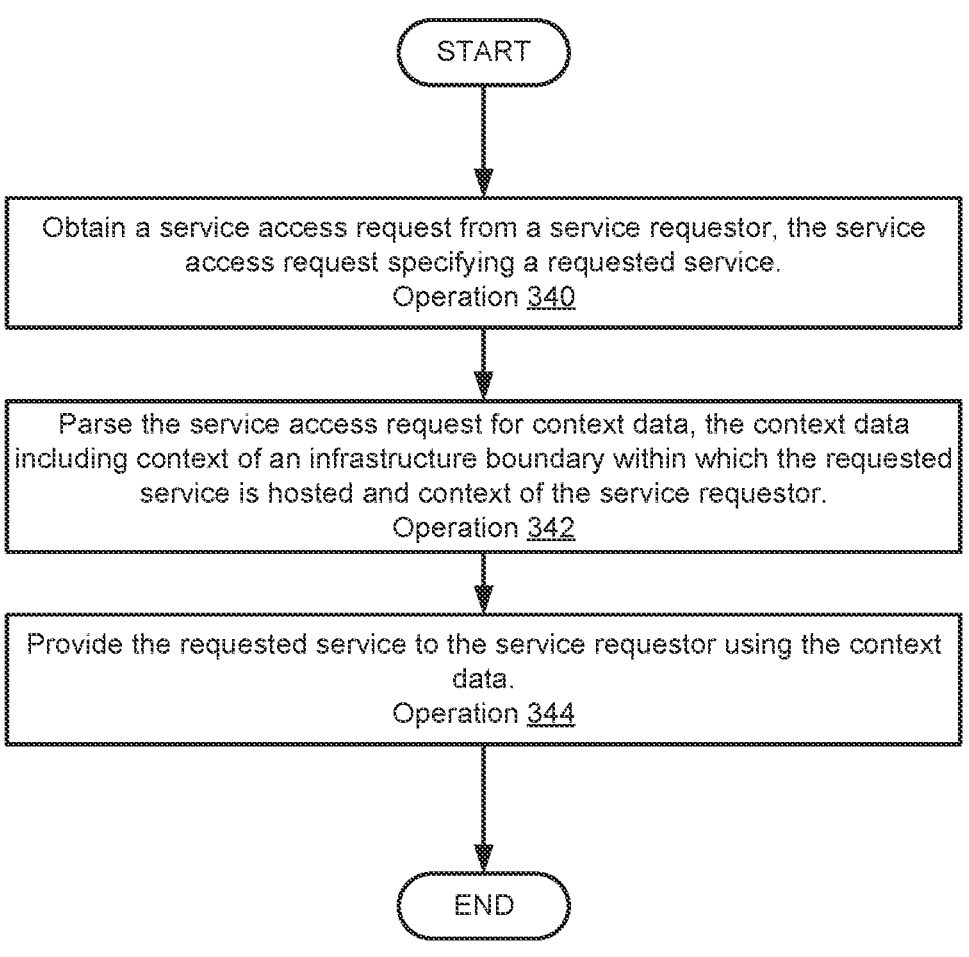

START

Obtain a service access request from a service requestor, the service access request specifying a requested service.
Operation 340

Parse the service access request for context data, the context data including context of an infrastructure boundary within which the requested service is hosted and context of the service requestor.
Operation 342

Provide the requested service to the service requestor using the context data.
Operation 344

END

FIG. 3C

SMART INFRASTRUCTURE ORCHESTRATION AND MANAGEMENT

FIELD

Embodiments disclosed herein relate generally to operation management. More particularly, embodiments disclosed herein relate to systems and methods to manage deployment of services.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flowcharts accordance with one or more embodiments.

DETAILED DESCRIPTION

Figure 1:
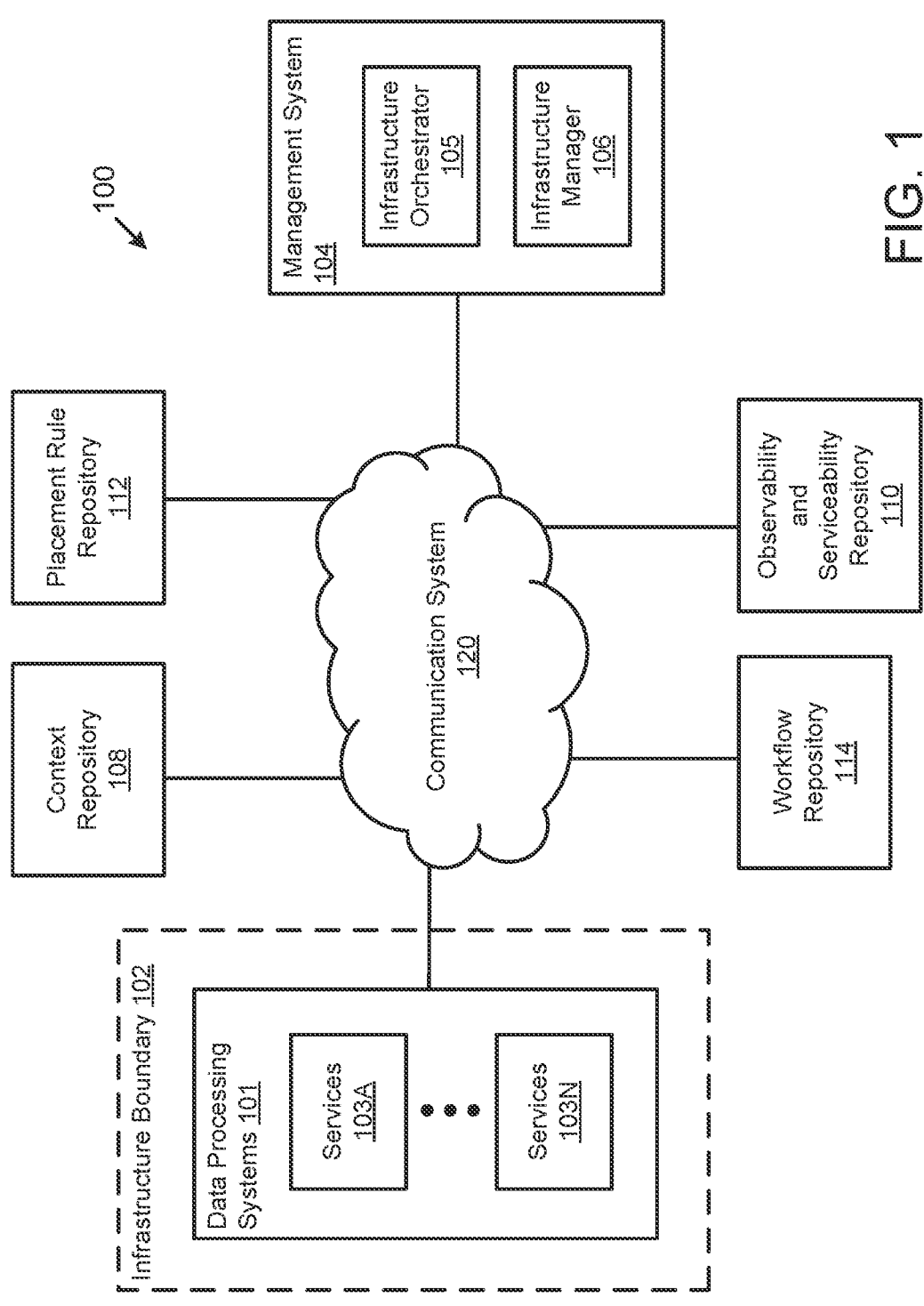
FIG. 1 shows a block diagram illustrating a system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for orchestrating (e.g., packaging, deploying, and provisioning) and managing (e.g., day-to-day monitoring and controlling of) services provided by data processing systems. To orchestrate and manage the services, various data (e.g., information) regarding the services and/or infrastructures hosting the services may be collected and used. The data regarding the services and/or infrastructures hosting the services may allow for dynamic orchestration and management of services within these infrastructures.

The data regarding the services and/or infrastructures hosting the services (e.g., service context data, service/infrastructure capability data, service/infrastructure placement rules, service workflow data, etc.) may be stored in various repositories. The repositories may also include images or other data structures usable to instantiate instances of the services. Such data regarding the services and/or infrastructures hosting the services are made available directly to the services and one or more systems that orchestrate and manage these services.

By doing so, a system in accordance with embodiments disclosed herein may provide for automatic and dynamic deployment and/or management of instances of complete services without relying on static or hard coded deployment schemes (e.g., without relying human intervention such as having a technician come in to manually configure or reconfigure services based on different delivery and/or deployment needs, or to manually specify where the service is requested or by whom the service is being requested by, or the like). For example, based on where a service is hosted within an infrastructure, various configurations (e.g., using various platform-specific deployment processes and/or tools) to the service may be required. Service behavior and/or optimizations may also be required when a service is requested by a service requestor (e.g., other services, a client device, or the like) that is not within that service's infrastructure. By having the appropriate context and service/infrastructure capability data (of the service itself and of the service requestor), services (or systems that orchestrate and manage these services) are able to automatically change (or request changes) to their own configurations to accommodate the service requestor's requests. Thus, embodiments disclosed herein may address, among others, the technical problem of resolving potential bottlenecks and resource availability concerns in a service orchestration and management system.

As another example, availability to service workflow data and service placement rules may allow computing devices that orchestrate and manage said services to reuse one or more existing workflows and place (e.g., deploy) the services appropriately (e.g., without causing bottlenecks in any existing infrastructures), thereby avoiding needlessly consuming limited computing resources and time to create a new workflow for each service orchestration instance and needlessly sending (e.g., deploying) newly instantiated (e.g., provisioned) services to the wrong locations. Thus, embodiments disclosed herein may provide, among others, an improvement to the existing technical problem of limited computing resources in such service orchestration and management systems.

In an embodiment, a method for managing services provided by data processing systems is provided. The method may include: obtaining a service access request from a service requestor, the service access request specifying a service running on at least one of the data processing systems; parsing the service access request for context data; and servicing the service requestor using the service and the context data.

Servicing the service requestor using the service and the context data may include: determining, based on the context data, that one or more adjustments to the service is required for the service to be able to service the service requestor; and in response to the determining, performing the one or more adjustments to the service to obtain a modified instance of the service adapted for the service requestor. The service requestor is serviced using the modified instance of the service adapted for the service requestor.

The context data included in the service access request is an aggregated context data that comprises context data of the service and context data of the service requestor. The context data of the service comprises information specifying, at least, where the service is provisioned within an infrastructure boundary that delimits the at least one of the data processing systems on which the service is running. The context data of the service requestor comprises information specifying, at least, an origin of the service access request, a target of the service access request, and a type of the service access request.

The information specifying the type of the service access request includes information that indicates a deployment stage of the infrastructure boundary and a deployment stage of the service.

The information specifying the target of the service access request includes the service and information that indicates whether the service requestor is within or external to the infrastructure boundary.

The one or more adjustments comprise, at least, an adjustment to a behavior of the service and an adjustment to a service flow of the service.

The service requestor is not required to make any adjustments in order to be serviced by the service.

The method may further include: determining that the one or more adjustments to the service resulted in a change in context for the service; recording the change in context as context data of the service; and storing the context data of the service in a context repository.

The context repository is remote to the data processing systems including the at least one of the data processing systems on which the service is running.

The context repository comprises context data of an infrastructure boundary that delimits the at least one of the data processing systems on which the service is running. The context data of the infrastructure boundary comprises context data of all services running within the infrastructure boundary. Storing the context data of the service in the context repository may include updating the context data of the infrastructure boundary with the context data of the service.

In an embodiment, a method for managing services provided by data processing systems using a management system is provided. The method may include: obtaining capability data of an infrastructure boundary from an observability and serviceability repository, the infrastructure boundary contains one or more of the data processing systems; using the capability data of the infrastructure boundary to generate service provisioning instructions for provisioning one or more services within the infrastructure boundary; and transmitting the service provisioning instructions to the infrastructure boundary to cause the one or more of the data processing systems contained in the infrastructure boundary to provision the one or more services.

The service provisioning instructions comprise instructions for provisioning a first sidecar for each of the one or more services to be provisioned within the infrastructure boundary. The first sidecar is configured to collect the capability data of the infrastructure boundary and store the capability data in the observability and serviceability repository.

The service provisioning instructions further comprise instructions for provisioning a second sidecar for each of the one or more services to be provisioned within the infrastructure boundary. The second sidecar is configured to collect context data of a respective service to which it is attached and store the context data in a context repository different from the observability and serviceability repository.

The infrastructure boundary includes a service mesh that collects the capability data of the infrastructure boundary and stores the capability data in the observability and serviceability repository.

The observability and serviceability repository and the context repository are both remote to the management system.

The capability data comprises, at least, functions, resources, and performances provided by the infrastructure boundary, the resources comprising tools and frameworks of the infrastructure boundary for capturing traces, logs, and metrics of the one or more of the data processing systems contained within the infrastructure boundary.

Provisioning of the one or more services by the infrastructure boundary causes a change of capability for the infrastructure boundary, and the first sidecar is configured to collect the capability data in response to the change of capability for the infrastructure boundary.

The method may further include: generating first context data for the infrastructure boundary using the service provisioning instructions; and storing the first context data for the infrastructure boundary in a context repository that is different from the observability and serviceability repository.

The method may further include: determining, before generating the service provisioning instructions, that second context data for the infrastructure boundary exists in the context repository; and obtaining the second context data for the infrastructure boundary from the context repository, wherein generating the service provisioning instructions comprises using the second context data the infrastructure boundary and the capability data to generate the service provisioning instructions, and wherein storing the first context data for the infrastructure boundary comprises updating the first context data for the infrastructure boundary using the second context data for the infrastructure boundary.

In an embodiment, a method for managing services provided by data processing systems using a management system is provided. The method may include: generating instructions for provisioning services within an infrastructure boundary set up for one or more of the data processing systems; generating, using the instructions, context data and placement rules for the services to be provisioned within the infrastructure boundary, the placement rules being based on the context data; storing the context data in a context repository and the placement rules in a placement rule repository; and transmitting the instructions to the one or more of the data processing systems to cause the one or more of the data processing systems to provision the services.

The method may further include: prior to generating the instructions, obtaining capability data associated with the infrastructure boundary from an observability and serviceability repository. Generating the instructions comprises using the capability data to generate the instructions, the placement rules being based on the context data and the capability data.

The placement rules comprise a first set of rules and restrictions specifying where, how many, and what type of services can be provisioned within the infrastructure boundary.

The placement rules further comprise a second set of rules and restrictions associated with workload placement and distribution associated with services running within the infrastructure boundary including the services to be provisioned based on the instructions.

The method may further include: dynamically updating the placement rules for the infrastructure boundary based on detected changes to the capability data in the observability and serviceability repository and the context data in the context repository.

The context repository, the placement rule repository, and the observability and serviceability repository are all remote to the management system.

The context repository, the placement rule repository, and the observability and serviceability repository are stored in the management system.

The placement rule repository comprises placement rules associated with other infrastructure boundaries different from the infrastructure boundary.

The method may further include: after transmitting the instructions, detecting that a change to existing services within the infrastructure boundary is required; in response to the detecting, generating a first service update plan for the infrastructure boundary based on, at least, the context data of the infrastructure boundary, the capability data of the infrastructure boundary, the placement rules of the infrastructure boundary, and the placement rules associated with the other infrastructure boundaries different from the infrastructure boundary; and transmitting the first service update plan to the one or more of the data processing systems to cause the one or more of the data processing systems to execute the first service update plan.

Generating the first service update plan may further include: making a first determination, using the placement rules of the infrastructure boundary, that the required change to the existing services within the infrastructure boundary cannot be implemented for the infrastructure boundary without causing a negative impact on the infrastructure boundary; making a second determination, in response to the first determination and using the placement rules associated with the other infrastructure boundaries different from the infrastructure boundary, that the required change to the existing services within the infrastructure boundary can be implemented for the infrastructure boundary without causing the negative impact on the infrastructure boundary by using the infrastructure boundary and at least one of the other infrastructure boundaries different from the infrastructure boundary; and in response to the second determination, generating a second service update plan for the at least one of the other infrastructure boundaries different from the infrastructure boundary in addition to the first service update plan. The first service update plan is transmitted to the infrastructure boundary and the second service update plan is transmitted to the at least one of the other infrastructure boundaries different from the infrastructure boundary.

In an embodiment, a method for managing services provided by data processing systems using a management system is provided. The method may include: obtaining a request to provision a service for an infrastructure boundary containing one or more of the data processing systems; in response to obtaining the request, obtaining first workflow data stored in a workflow repository; generating service provisioning instructions using the first workflow data; and transmitting the service provisioning instructions to the one or more of the data processing systems of the infrastructure boundary to cause the one or more of the data processing systems to initiate provisioning of the service.

The method may further include: generating, based on the service provisioning instructions, second workflow data that comprises a first workflow to be implemented by the one or more of the data processing systems for the provisioning of the service; and storing the second workflow data in the workflow repository with the first workflow data.

The first workflow data comprises: second workflows previously implemented by the one or more of the data processing systems to provision existing services running in the infrastructure boundary prior to the provisioning of the service by the infrastructure boundary, and third workflows previously implemented by other ones of the data processing systems associated with other infrastructure boundaries different from the infrastructure boundary to provision existing services running in the other infrastructure boundaries prior to the provisioning of the service by the infrastructure boundary.

Generating the service provisioning instructions using the first workflow data comprises recycling at least one of the second workflows or at least one of the third workflows as the first workflow.

The second workflow data includes information that indicates one or more workflow compositions implemented by the one or more of the data processing systems to provision the service and one or more workflow components used by the one or more of the data processing systems to provision the service, the one or more workflow components comprise hardware and software components available in the one or more of the data processing systems.

The service provisioning instructions are further generated based on context data associated with the infrastructure boundary stored in a context repository, capability data associated with the infrastructure boundary stored in an observability and serviceability repository, and placement rules associated with the infrastructure boundary stored in a placement rule repository.

The workflow repository, the context repository, the placement rule repository, and the observability and serviceability repository are all remote to the management system.

The workflow repository, context repository, the placement rule repository, and the observability and serviceability repository are stored in the management system.

The method may further include: monitoring the service after the service is provisioned; detecting, during the monitoring, that a change to the service has been made by the one or more of the data processing systems, the change to the service causing a change to the first workflow; and in response to the detecting, updating the workflow repository to include the change to the first workflow.

Generating the second workflow data may include: generating context data for the service to be provisioned, the context data being based on the service provisioning instructions; and overlaying the context data on workflow component metadata included in the first workflow.

In an embodiment, a non-transitory media is provided. The non-transitory media may include instructions that when executed by a processor cause any of the above computer implemented methods to be performed.

In an embodiment, a data processing system and/or a management system is provided. The data processing system and/or the management system may include the non-transitory media and a processor, and may perform any of the above computer implemented methods when the computer instructions are executed by the processor.

Turning to FIG. 1, a block diagram illustrating a system 100 in accordance with an embodiment is shown. The system 100 shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 101. Data processing systems 101 may provide the computer implemented services to users of data processing systems 101 and/or to other devices (not shown). Different data processing systems may provide similar and/or different computer implemented services.

To provide the computer implemented services, data processing systems 101 may include various hardware components (e.g., processors, memory modules, storage devices, etc.) and host various software components (e.g., operating systems, application, startup managers such as basic input-output systems, etc.). These hardware and software components may provide the computer implemented services via their operation.

The software components may be implemented using various types of services. For example, each data processing system of the data processing systems 101 may host various services 101A-101N that provide the computer implemented service (e.g., application services) and/or that manage the operation of these services 101A-101N (e.g., management services). The aggregate (e.g., combination) of the management and application services may be a complete service that provide desired functionalities.

Although not shown in FIG. 1, each service of services 103A-103N may be instantiated (e.g., packaged, deployed, provisioned, etc.) with one or more sidecars. Each sidecar of a service may be configured with a specific functionality. For example, each service may be instantiated with a sidecar that collects and reports (e.g., stores to a repository) context data (discussed in more detail below) of the service. Each service may also be instantiated with a sidecar that collects and reports (e.g., stores to a repository) capability data (discussed in more detail below) of the service and the infrastructure boundary in which the service is hosted. Alternatively, instead of having multiple sidecars, each service may be implemented with a single sidecar that provides all of the above-discussed data collection and reporting functions.

Additionally, although not shown in FIG. 1, each infrastructure boundary 102 may be configured to include a service mesh. Each service mesh may be configured to provide the same data collection and reporting functionalities provided by the above-discussed sidecars. A boundary of each infrastructure boundary 102 may be defined by the boundary of the service mesh servicing that respective infrastructure boundary 102. In embodiments, each infrastructure boundary 102 may include any combination of sidecars and the service mesh. For example, an infrastructure boundary 102 may include just the sidecars, just the service mesh, or both the sidecars and the service mesh.

The data processing systems 101 may also be divided into groups. Each group of data processing systems 101 may be delineated by a boundary (e.g., infrastructure boundary 102). Each group of data processing systems 101 may include a single or multiple ones of the data processing systems 101. For example, an instance of the infrastructure boundary 102 may include only a single server providing storage services (e.g., cloud storage services, or the like). As another example, another instances of the infrastructure boundary 102 may include all computing devices located in a physical building (e.g., a campus and/or building of a company, institution, or the like). Although not explicitly shown in FIG. 1, the system 100 may also include multiple ones of the infrastructure boundary 102.

In general, embodiments disclosed herein may provide methods, systems, and/or devices for providing computer implemented services using complete services. To provide the computer implemented services, various services corresponding to a complete service may be instantiated. As demand for different types of computer implemented services changes over times, different types of complete services may be instantiated.

To orchestrate and manage complete service instantiation, the system of FIG. 1 may include management system 104, context repository 108, observability and serviceability repository 110, placement rule repository 112, and workflow repository. Each of these components is discussed below.

Management system 104 may (e.g., using infrastructure orchestrator 105 and infrastructure manager 106) (i) identify management services and application services (e.g., in aggregate, a "set of required services") for complete services, (ii) identify existing services that may be used to meet the set of required services for new complete services, (iii) instantiate new instances of services to satisfy the set of required services for a complete service, and (iv) initiate operation of the new complete service using the identified existing services and newly instantiated services. When providing its functionality, management system 104 may utilize information stored in the various repositories 108-114 to identify the set of required services.

Management system 104 may include various hardware components (e.g., processors, memory modules, storage devices, etc.) and host various software components (e.g., operating systems, application, startup managers such as basic input-output systems, etc.). These hardware and software components may provide the functionalities of the infrastructure orchestrator 105 and infrastructure manager 106 via their operation.

Each of the infrastructure orchestrator 105 and the infrastructure manager 106 may be individual computing devices hosted within the management system 104. For example, the management system 104 may be a large-scale server comprised of multiple computing devices (including the respective computing devices that make up the infrastructure orchestrator 105 and the infrastructure manager 106). Alternatively, the management system 104 may be a single computing device configured to provide the functionalities of both the infrastructure orchestrator 105 and the infrastructure manager 106. Even further, although FIG. 1 shows the infrastructure orchestrator 105 and infrastructure manager 106 as being hosted within a single entity (e.g., the management system 104), each of the infrastructure orchestrator 105 and the infrastructure manager 106 may be hosted at different physical locations (e.g., not within a single server, computing device, or the like) without departing from the scope of one or more embodiments disclosed herein.

Context repository 108 may store context information (e.g., context data) regarding each of the services 103A-103N hosted by data processing systems 101. More specifically, the context repository 108 may store context information for services within a single infrastructure boundary 102 or multiple ones of the infrastructure boundary. Context data may include environmental configuration parameters and/or the dependencies/prerequisites required to invoke any of the services 103A-103N (e.g., invoke the service application programming interface (API) of each service 103A-103N). The dependencies/prerequisites required to invoke any of the services may include information that indicates how the services are linked and connected (e.g., a first service within an infrastructure boundary can only be accessed (e.g., invoked) through a second service within the infrastructure boundary). Examples of context data (for each service) may include, but is not limited to: (i) where the service is provisioned within an infrastructure boundary (e.g., in a data center, at an edge of the boundary, in the cloud, etc.) including the actual location (e.g., physical and/or non-physical address) of the service within the infrastructure boundary and the service's dependencies/prerequisites; (ii) origin of a request (e.g., by a service requestor such as another service) to access the service (e.g., did the request originate within or external to the infrastructure boundary, is the request from a user interface (UI) of from an API, or the like); (iii) a target of the request (e.g., to another service within or external to an infrastructure boundary, or the like); a type of the request (e.g., deployment stage of an infrastructure boundary or one or more services, life cycle stage of an infrastructure boundary or one or more services, or the like); or the like.

Observability and serviceability repository 110 may store capability data of one or more infrastructure boundary 102 and/or services 103A-103N. More specifically, the capability data associated with a specific infrastructure boundary 102 specifies all of the capabilities (e.g., functions, resources, performances, etc.) offered by that specific infrastructure boundary 102. For example, the capability data may include, but is not limited to: (i) tools and frameworks of an infrastructure boundary to capture traces, logs, and metrics of data processing systems 101 and services 103A-103N within the infrastructure boundary; (ii) one or more solutions (e.g., call-home, remote connectivity, and/or other connectivity-related solutions) available within an infrastructure boundary; or the like. Such capability data may be derived (e.g., by the management system 104) from the context data stored in the context repository 108, provided by an administrator of the infrastructure boundary 102 and/or the management system 104, and/or obtained from any other source (e.g., a sidecar of/attached to any of the services 103A-103N).

Placement rule repository 112 may store a set of rules and restrictions (e.g., placement rules) specifying where, how many, and what type of services can be provisioned within an infrastructure boundary. The placement rules may also include rules and restrictions associated with workload placement and distribution within an infrastructure boundary 102 (and/or across one or more infrastructure boundaries) based on, but not limited to: resource availability, types of services to be implemented, affinity and anti-affinity requirements of existing and/or to be implemented services, fault-domain identification, or the like. Such placement rules may be derived (e.g., by the management system 104) using the context data stored in the context repository 108 and the capability data stored in the observability and serviceability repository 110, and may be dynamically updated as the context data and capability data are updated. Additionally or alternatively, such placement rules may be provided by an administrator of the infrastructure boundary 102 and/or the management system 104.

Workflow repository may store workflow data specifying one or more workflow composition and components (e.g., sequential steps, processes, procedures, devices, hardware and/or software components, or the like) implemented when a service, among services 103A-103N, is first provisioned and/or subsequently changed (e.g., updated, terminated, scaled, migrated, or the like). Such workflow components may be self-describing and identify the composed rules and metadata that map to the context data (e.g., the context data is overlaid on the workflow component metadata for selection of the components to execute a workflow for implementing a service). The workflow data may be stored by the management system 104 during the orchestration and management of the services 103A-103N of one or more of the infrastructure boundaries 102. The workflow data may also be stored by each service (e.g., via API calls, or other similar functions) of the services 103A-103N as the services change (e.g., are updated, terminated, scaled, migrated, or the like) over time.

The data stored in the context repository 108, observability and serviceability repository 110, placement rule repository 112, and workflow repository 114 may be captured and reported (e.g., by the sidecar, service mesh, or any of the other components of FIG. 1) at any time. For example, the data may be captured and reported: (i) during an initial (e.g., day 1) solution deployment (e.g., deployment of one or more services, or an entire infrastructure boundary) by the management system 104 (using, for example, the infrastructure orchestrator 105); (ii) during any day N (e.g., any number of days) updates to deployed the services 103A-103N after the initial deployment; or the like.

The data stored in the context repository 108, observability and serviceability repository 110, placement rule repository 112, and workflow repository 114 may be collected from any number of the infrastructure boundary 102.

Any of the data stored in the context repository 108, observability and serviceability repository 110, placement rule repository 112, and workflow repository may be used by any of the components of FIG. 1. For example, any of the services may capture the context data in the context repository when calling another service (e.g., requesting service from another service) to locate the actual location of the service being called within an infrastructure boundary 102 hosting the service being called. The calling service (e.g., the service calling another service) may aggregate its own context data with the captured context data and provide the aggregated context data to the service being called. The service being called then uses the aggregated context to determine what needs to be done (e.g., change the service's behavior, configurations, or the like) to service (e.g., to provide its services to) the calling service. Said another way, one or more working parameters (e.g., behavior, configurations, service flow, or the like) of the service are adjusted based on the context data to be able to service the service requestor (e.g., to adapt to, for example the environment and other factors and/or executing parameters of, the service requestor). Upon adjustment, a modified instance of the service that is adapted for the service requestor will be obtained and provided to the service requestor. This will be discussed in more detail below in FIGS. 2A-2C.

By doing so, embodiments disclosed herein may facilitate deployment of new complete services without relying on static descriptions or hard coded plans for deploying new instances of complete services and management of deployed services. Said another way, the service requestor (e.g., the calling service) is not required to make any explicit design changes to accommodate the requested service. Instead, the requested service (or application programming interface (API) of the requested service) must operate appropriately to accommodate and adapt to the service requestor based on the supplied and/or discovered context data. Embodiments disclosed herein may also allow callers (e.g., requestors) for services to become caller-agnostic (e.g., such that said callers may access services without requiring any particular adaptations; rather, the services of APIs would operate appropriately based on the supplied or discovered context of the callers, and vice versa).

For example, the disclosed system 100 may facilitate dynamic identification, deployment, and stitching (e.g., integration and management) of new and existing services. Refer to FIGS. 2A-9 for additional details regarding information stored in the context repository 108, observability and serviceability repository 110, placement rule repository 112, and workflow repository 114, and deployment and management of complete services using information (e.g., data) stored in these repositories.

Each of the context repository 108, observability and serviceability repository 110, placement rule repository 112, and workflow repository 114 may be an individual computing device (e.g., a remote storage device) that includes various hardware components (e.g., processors, memory modules, storage devices, etc.) and host various software components (e.g., operating systems, application, startup managers such as basic input-output systems, etc.). These hardware and software components may provide the storage functionalities of each repository via their operation.

Alternatively, all of the context repository 108, observability and serviceability repository 110, placement rule repository 112, and workflow repository 114 may be hosted on a single computing device (e.g., a storage server). For example, the computing device may have storage that is partitioned into four separate areas, each for storing data associated with each of the context repository 108, observability and serviceability repository 110, placement rule repository 112, and workflow repository 114. The single computing device may be the management system 104. The single computing device may also be computing device that is separate and distinct from the management system 104 that is connected to the management system 104 and data processing systems via communication system 120.

Even further, any or all of the context repository 108, observability and serviceability repository 110, placement rule repository 112, and workflow repository 114 may be stored (e.g., hosted as physical or non-physical forms of storage) in any one or multiple one of the data processing systems of an infrastructure boundary 102.

When providing its functionality, management system 104, context repository 108, observability and serviceability repository 110, placement rule repository 112, and/or workflow repository 114 may perform all, or a portion, of the methods illustrated in FIGS. 2A-9.

Any of management system 104, context repository 108, observability and serviceability repository 110, placement rule repository 112, and/or workflow repository 114 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 10.

Data processing systems 101 may be implemented with multiple computing devices. The computing devices of data processing system 101 may perform similar and/or different functions.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While illustrated in FIG. 1 as including a limited number of specific components, a system in accordance with an embodiment may include fewer, additional, and/or different components than those illustrated therein.

In the below description of FIGS. 2A-9, although each of the infrastructure orchestrator 105 and the infrastructure manager 106 are described as performing specific processes (e.g., operations), all of the operations performed by the infrastructure orchestrator 105 may be performed by the infrastructure manager 106, and vice versa, without departing from the scope of embodiments disclosed herein. The management system 104 as a whole (e.g., as a single entity) may also perform all of the processes performed by both the infrastructure orchestrator 105 and the infrastructure manager 106.

Figure 2A:
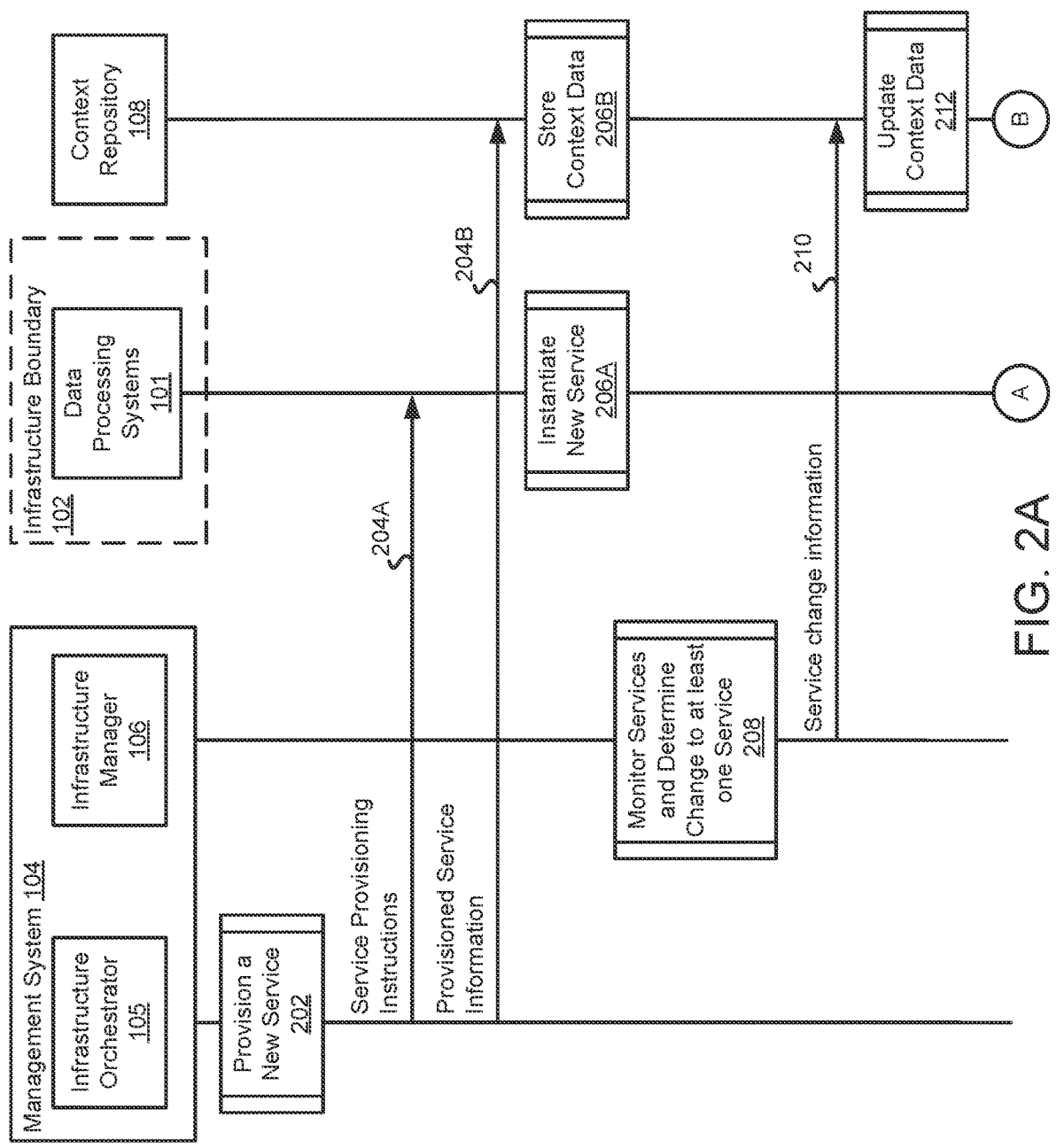
FIGS. 2A-2B show data flow diagrams in accordance with one or more embodiments.
Figure 2B:
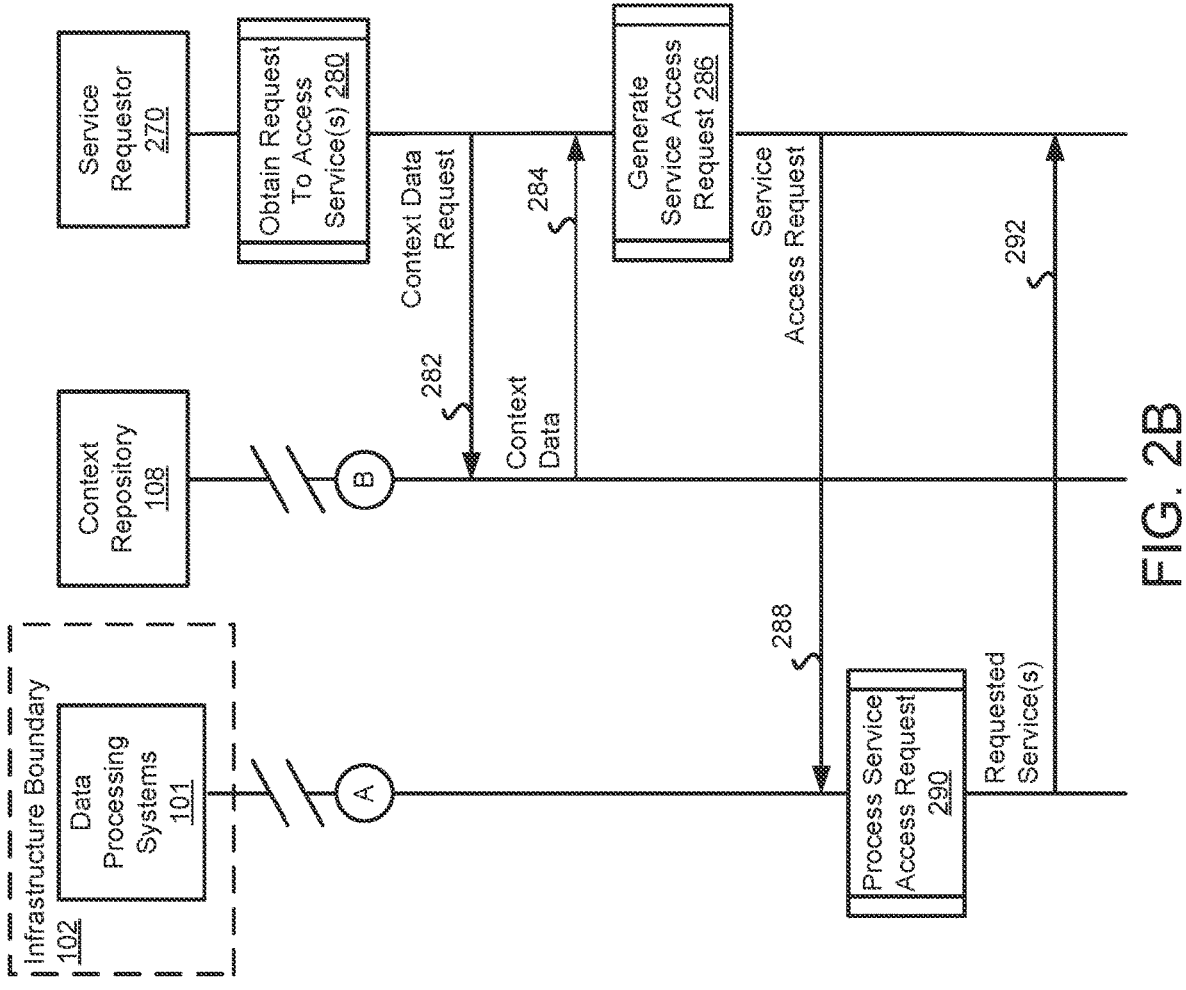

Turning now to FIGS. 2A-2B, FIGS. 2A-2B, a data flow diagram in accordance with one or more embodiments is shown. The data flow diagram may illustrate a service orchestration and management process using context data to be performed within a system similar to system 100 of FIG. 1. As discussed in FIG. 1, data processing systems 101 within an infrastructure boundary 102, management system 104 including infrastructure orchestrator 105 and infrastructure manager 106, context repository 108, observability and serviceability repository 110, placement rule repository 112, and workflow repository 114 may be connected to one another via communication system 120, allowing the systems and/or devices to communicate and exchange information with one another.

At operation 202, the infrastructure orchestrator 105 provisions a new service. The new service may be provisioned for an existing infrastructure boundary 102 that already includes services. Alternatively, the new service may be provisioned as part of provisioning a new infrastructure boundary 102 for one or more data processing systems 101. In any case, the provisioning of the new service may be the day 0 provisioning (e.g., provisioning of a product (e.g., computing device) including the service or the service itself at a factory or other site of the service provider) of that new service. Multiple ones of the new service can be provisioned in operation 202. In one example, the management system 104 may be a cloud server and/or cloud-based service provider that distributes packaged services to data processing systems 101 within the infrastructure boundary 102.

At operation 204A, the infrastructure orchestrator 105 transmits service provisioning instructions to one or more data processing systems 101 within the infrastructure boundary. The service provisioning instructions may be transmitted to the specific data processing systems 101 that will be hosting the new service. The service provisioning instructions may include a solution specification that includes all information necessary (e.g., where in the infrastructure boundary 102 the service should be implemented, how the service should be implemented, bootstrapping data, configuration data, a Standard of Procedures (SoP), or the like) for the data processing system(s) 101 receiving the new service to implement (e.g., run) the new service. Consequently, in operation 206A, the new service is instantiated (e.g., provisioned, implemented, etc.) by the data processing systems 101 of the infrastructure boundary 102.

At operation 204B, the infrastructure orchestrator 105 uses the information (e.g., provisioned service information) associated with the service provisioning instructions in operation 204A to compile context data (as discussed above in reference to FIG. 1) for the new service. Once the context data is compiled, the context data is transmitted (by the infrastructure orchestrator 105) to the context repository 108. Consequently, in operation 206B the context data associated with the provisioned new service is stored by the context repository 108. For example, the context data may include: where the service is provisioned within the infrastructure boundary 102 (e.g., at a data center, at an edge of the boundary, on a cloud, etc.) including the actual location (e.g., physical and/or non-physical address) of the service within the infrastructure boundary and the service's dependencies/prerequisites; which other services (if any) that the new service will be connected (e.g., which other existing services will have to be accessed to reach the new service once the new service is provisioned). The dependencies/prerequisites required to invoke any of the services may include information that indicates how the services are linked and connected (e.g., a first service within an infrastructure boundary can only be accessed (e.g., invoked) through (a second service within the infrastructure boundary).

In operation 208, the infrastructure manager 106 monitors the services running within (e.g., hosted within) the infrastructure boundary 102 and determines that a change (e.g., a termination, a migration, an update, a scaling, etc.) has been made to at least one service of the services. This monitoring of the services by the infrastructure manager 106 can be performed at any time (and at any interval (e.g., a pre-set interval defined by an administrator of the management system 104)) once an infrastructure boundary 102 hosting services has been set up (e.g., as part of a day N monitoring of provisioned services, where N can be any positive whole number).

In response to the determination in operation 208, the infrastructure manager 106 (as part of operation 210) compiles new (e.g., updated) context data based on the determined change to the at least one service and transmits such new (e.g., updated) context data as service change information to the context repository. The new context data includes new context of the at least one service that was changed and any new context of existing services that were changed (e.g., affected) as a result of the change to the at least one service.

Consequently, the context repository 108 receives the service change information and updates (in operation 212) the previously stored context data associated with the infrastructure boundary 102 to reflect the changes to the at least one service (and changes to other existing services as a consequence of the change to the at least one service).

Although not shown in FIG. 2A, at any point in time after a new service is provisioned for an infrastructure boundary 102, the sidecar of the service and/or the service mesh of the infrastructure boundary may also collect any detected changes in the service and report (e.g., store) the detected changes in the context repository 108 as context data of that service. Essentially, the context repository 108 should always have the most up-to-date context data for each and every service hosted within an infrastructure boundary.

Turning now to FIG. 2B, at any point in time after an infrastructure boundary 102 has been set up (e.g., at any point in time after services are running within an infrastructure boundary 102), a service requestor 270 (e.g., a client of the management system, a calling service, or the like) may obtain (e.g., at operation 280 and via a user of a computing device) a request to access one or more services running within the infrastructure boundary 102.

In response to receiving the request to access the service(s), the service requestor 270 obtains context data for the service(s) for which access is requested by sending a context data request (at operation 282) to the context repository 108 and receiving the context data from the context repository 108 (at operation 284). In embodiments, the context data request transmitted at operation 282 may include specific information identifying the service(s) to be accessed. In this example, only the context data associated with the specified service(s) will be returned in operation 284. Alternatively, the context data request may include an identification (e.g., name, unique boundary identification (ID), etc.) of the infrastructure boundary 102. In this example, context data of all services available within the infrastructure boundary 102 will be returned in operation 284.

At operation 286, the service requestor 270 aggregates the context data received from the context repository 108 along with its own context data (e.g., context data associated with the service requestor 270) and generates a service access request that includes the aggregated context data (along with information/instructions specifying that the service requestor 270 wishes to access specific service(s)). Context data associated with the service requestor may include, for example: (i) an origin of the request (e.g., within or external to the infrastructure boundary 102, from a UI or from an API, or the like); (ii) target of the request (e.g., to another service or services within or external to the infrastructure boundary, or the like); (iii) a type of request (e.g., deployment stage of the infrastructure boundary 102 or requested service(s), life cycle state stage of the infrastructure boundary 102 or requested service(s), or the like). The origin of the request may also include where the service requestor is sitting (e.g., located) within the system 100 (e.g., system 100 of FIG. 1) including the location of the service requestor within an infrastructure boundary (data center, at an edge of the boundary, in the cloud, etc.) the physical and/or non-physical address of the service requestor and, if the servicer requestor is another service, the dependencies/prerequisites of the service requestor.

At operation 288, the service requestor 270 transmits the service access request to the infrastructure boundary 102 (namely, the data processing systems 101 within the meets and bounds of the infrastructure boundary 102).

At operation 290, the data processing systems 101 of the infrastructure boundary 102 process the service access request to determine which services are being requested by the service requestor 270. Using the aggregated context data, the requested services(s) (e.g., via the data processing systems 101) are able to determine whether any changes (e.g., behavioral changes, configuration changes, etc.) are needed in order for the services to provide service to the service requestor 270.

At operation 292, the requested service(s) (e.g., via the data processing systems 101) implement the determined changes necessary for these services to provide service to the service requestor 270. Once the changes are implemented, the requested service(s) provide the service(s) to the service requestor 270. Said another way, one or more working parameters (e.g., behavior, configurations, flow, or the like) of the service may have to be adjusted based on the context data for the service to be able to service the service requestor (e.g., to adapt to, for example the environment and other factors and/or executing parameters of, the service requestor). Upon adjustment, a modified instance of the service that is adapted for the service requestor will be obtained and provided to the service requestor.

As discussed above, such changes to these requested service(s) may result in the infrastructure manager 106 (and/or the sidecar and service mesh) to collect and report these changes to the context repository 108 (e.g., update the context data of the services within the infrastructure boundary 102).

As a result, an improved system is obtained where the context data is advantageously used to change a requested service's behavior or service flow, eliminate statically defined operations (e.g., workflows) or hard-coded conditional logic of the requested service(s), and optimize the overall experience for service requestors (that now becomes a caller-agnostic entity that does not need to adapt to the requested services but vice versa where the requested service adapts to the service caller) to receive the requested services.

Figure 3A:
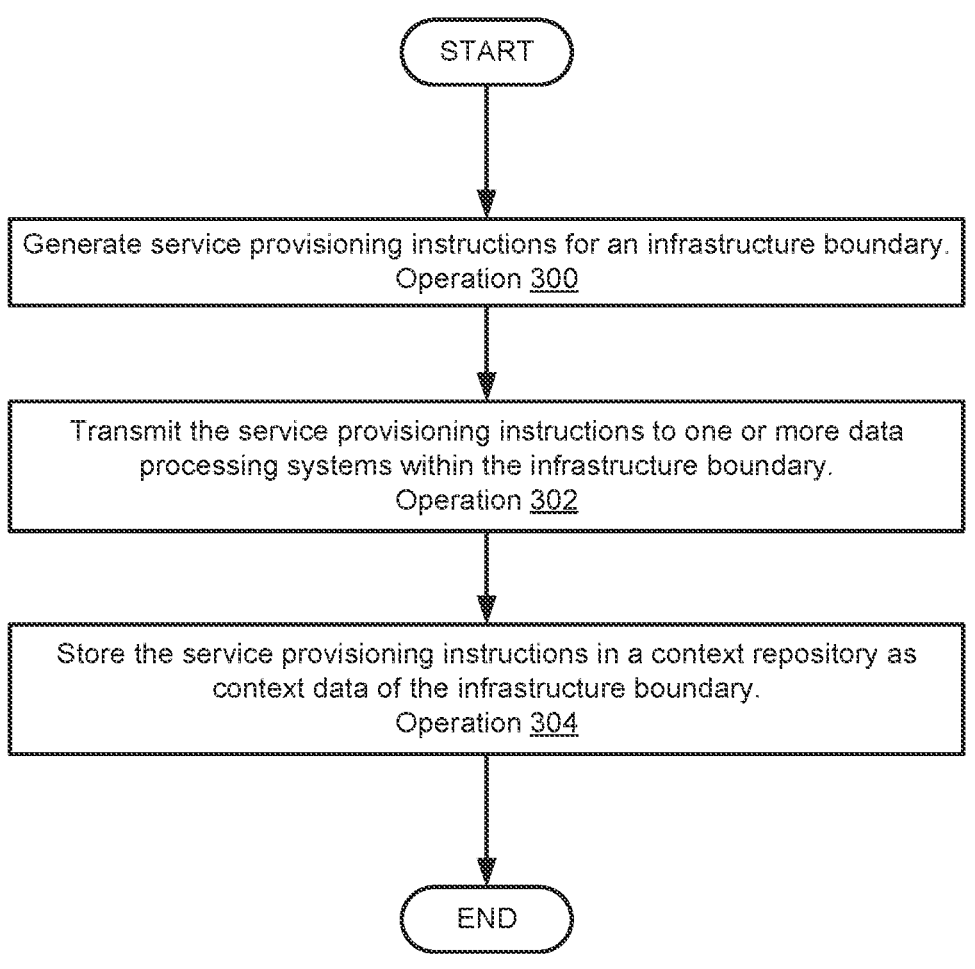
Figure 3B:
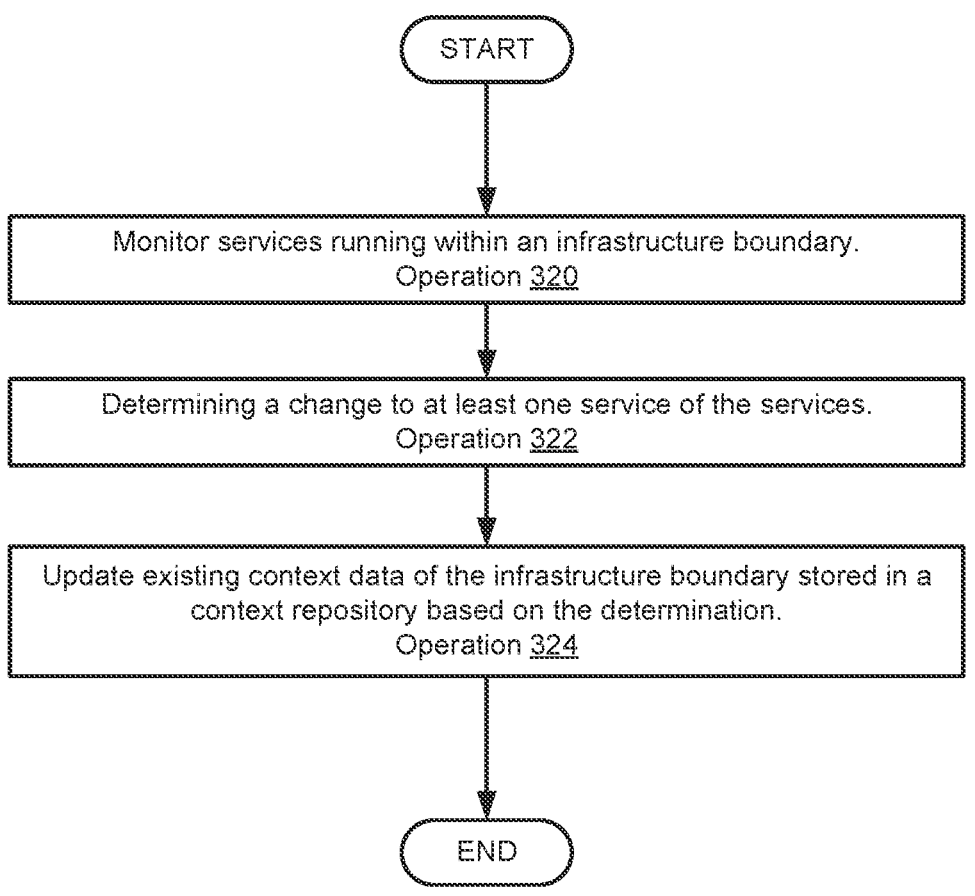

Turning to FIGS. 3A-3C, FIGS. 3A-3C illustrate flowcharts associated with the service orchestration and management process using context data of FIGS. 2A-2B. The operations (e.g., steps) in each of the flowcharts of FIGS. 3A-3C may be performed by any combination of the devices/components shown in FIG. 1. Any operations described with respect to FIGS. 3A-3C may be performed in different, skipped, repeated, and/or be performed in a parallel or partially overlapping in time manner.

Starting with FIG. 3A, in operation 300, service provisioning instructions may be generated for an infrastructure boundary. As discussed above in reference to FIG. 2A, the service provisioning instructions may be generated for provision new service(s) for an existing infrastructure boundary that already includes services. Alternatively, service provisioning instructions may be generated as part of provisioning an entirely new infrastructure boundary for one or more data processing systems.

At operation 302, as discussed above in reference to FIG. 2A, the service provisioning instructions are transmitted to one or more data processing systems within the infrastructure boundary such that the service(s) (or the entire infrastructure boundary itself) may be provisioned by the data processing system(s).

At operation 304, as discussed above in reference to FIG. 2A, the service provisioning instructions are stored (as context data for the infrastructure boundary) in a context repository.

The method may end following operation 304.

Turning to FIG. 3B, in operation 320, services running within an infrastructure boundary may be monitored. For example, as discussed above in reference to FIG. 2A, the services may be monitored by an infrastructure manager for one or more changes to the service. The services may also be monitored by one or more sidecars (of the service) of a service mesh (of the infrastructure boundary) configured to monitor changes to the services within the infrastructure boundary.

In operation 322, a change to at least one service of the services is determined to have occurred. The change may be detected by any of the infrastructure manager, the sidecar (of the respective service that has changed), and/or the service mesh of the infrastructure boundary containing the at least one service.

In operation 324, as discussed above in reference to FIG. 2A, the component that detected the change to the at least one service collects information regarding the changes and reports the changes (as context data) to the context repository. In response, the context repository updates the existing context data of the infrastructure based on the new context associated with the detected changes to the at least one service.

The method may end following operation 324.

Turning to FIG. 3C, in operation 340, a service access request may be obtained (e.g., by one or more data processing systems on which one or more requested services are running) from a service requestor. The service requestor specifies the requested service(s) in the service access request. The service requestor also includes, as part of the service access request, aggregated context data including: context data of the service requestor; and context data of the requested service(s) (or of the entire infrastructure boundary in which the requested service(s) are running).

In operation 342, the service access request is parsed (e.g., by the data processing systems on which one or more requested services are running) for the aggregated context data.

In operation 344, as discussed above in reference to FIG. 2B (namely, see for example, operations 290 and 292 of FIG. 2B), the requested service(s) are provided (e.g., by the data processing systems on which one or more requested services are running) to the service requestor based on the aggregated context data included in the service access request obtained in operation 340.

The method may end following operation 344.

Figure 4A:
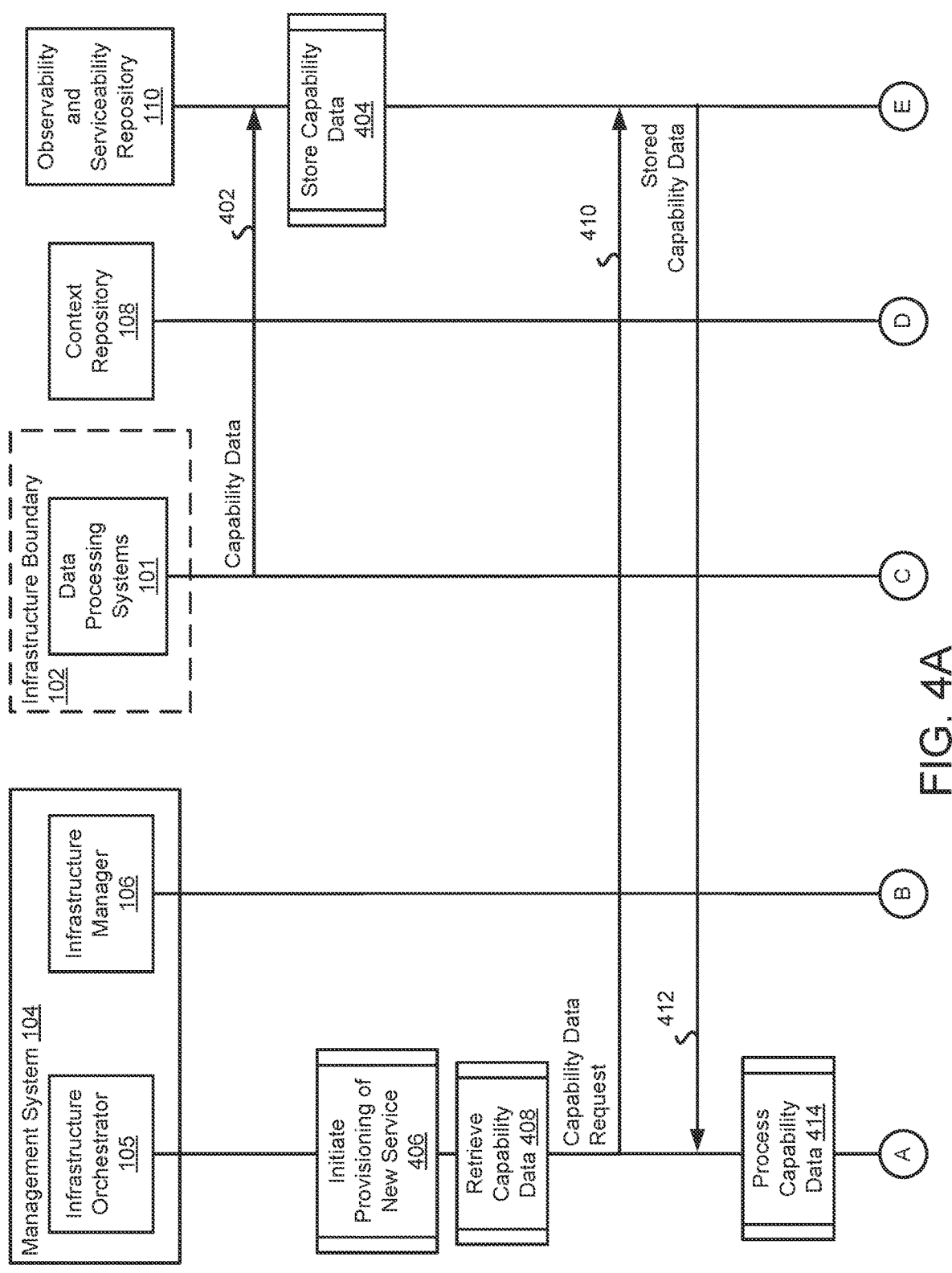
FIGS. 4A-4B show data flow diagrams in accordance with one or more embodiments.
Figure 4B:
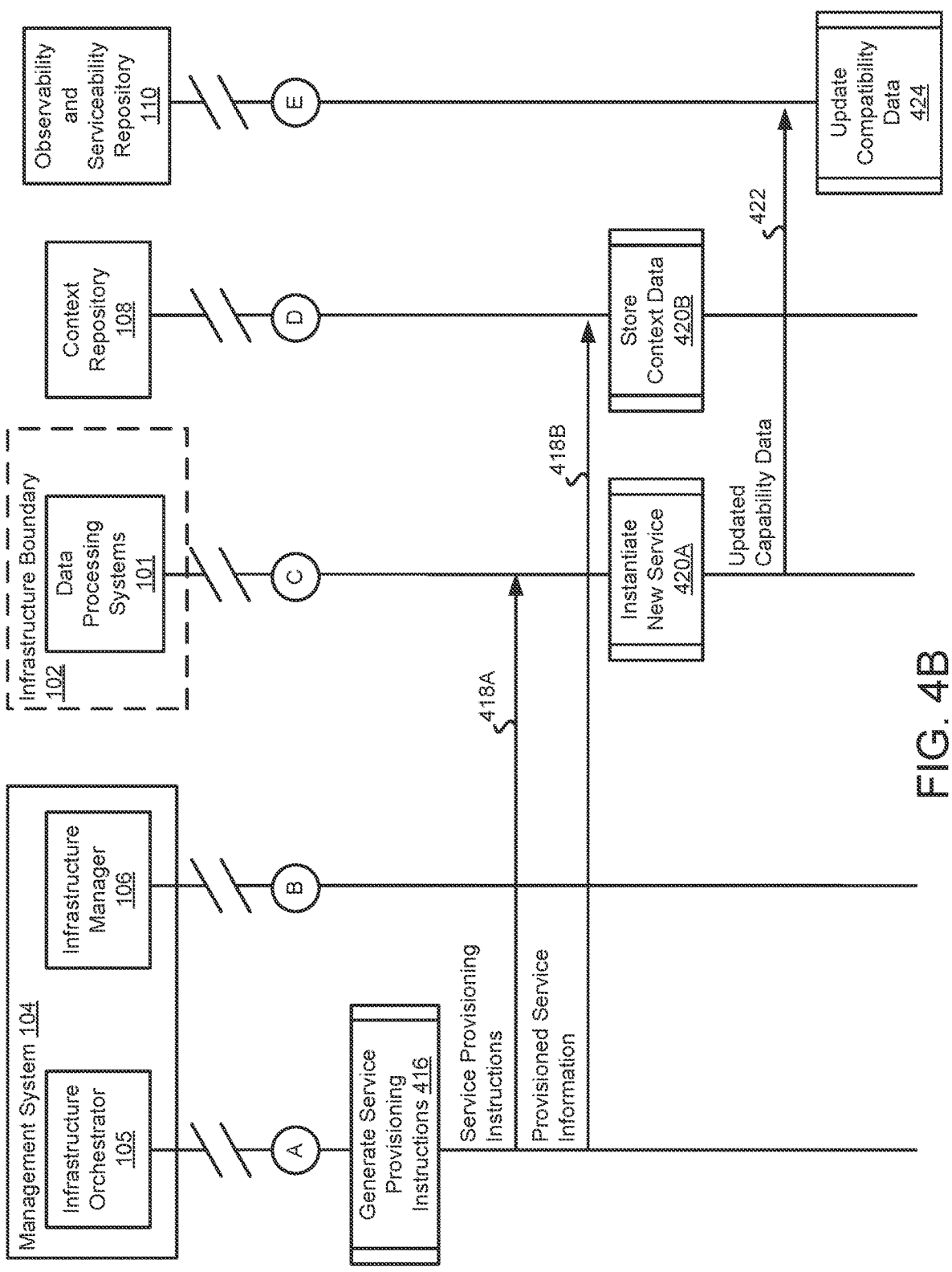

Turning now to FIGS. 4A-4B, FIGS. 4A-4B, a data flow diagram in accordance with one or more embodiments is shown. The data flow diagram may illustrate a service orchestration and management process, using context data and capability data, to be performed within a system similar to system 100 of FIG. 1. As discussed in FIG. 1, data processing systems 101 within an infrastructure boundary 102, management system 104 including infrastructure orchestrator 105 and infrastructure manager 106, context repository 108, observability and serviceability repository 110, placement rule repository 112, and workflow repository 114 may be connected to one another via communication system 120, allowing the systems and/or devices to communicate and exchange information with one another.

In operation 402, the data processing systems 101 of infrastructure boundary 102 provide capability data to an observability and serviceability repository 110. The capability data associated with a specific infrastructure boundary 102 specifies all of the capabilities (e.g., functions, resources, performances, etc.) offered by that specific infrastructure boundary 102.

For example, the capability data may include, but is not limited to: (i) tools and frameworks of an infrastructure boundary to capture traces, logs, and metrics of data processing systems 101 and services 103A-103N within the infrastructure boundary; (ii) one or more solutions (e.g., call-home, remote connectivity, etc.) available within an infrastructure boundary; or the like. Such capability data may be derived (e.g., by the management system 104) from the context data stored in the context repository 108, provided by an administrator of the infrastructure boundary 102 and/or the management system 104, and/or obtained from any other source (e.g., a sidecar of any of the services 103A-103N).

In operation 404, the observability and serviceability repository 110 stores the capability data received from the data processing systems 101.

In operation 406, the infrastructure orchestrator 105 initiates provisioning of a new service for infrastructure boundary 102 and retrieves (in operation 408) the capability data stored in the observability and serviceability repository 110 by transmitting a capability data request in operation 410.

In response to the capability data request, the infrastructure orchestrator receives the most recent copy of the capability data (associated with infrastructure boundary 102) from the observability and serviceability repository 110 in operation 412. In operation 414, the infrastructure orchestrator 105 processes the capability data (along with existing context data of the infrastructure boundary 102 and new context data of the new service(s)) to determine whether and how the new service can be provisioned in the infrastructure boundary 102.

In embodiments, similar to operations 204A-206B discussed above in reference to FIG. 2A, in operation 416, the infrastructure orchestrator (after processing the capability data) generates service provisioning instructions to provision the new service(s) for the infrastructure boundary 102, transmits the service provision instructions to the data processing systems 101 in operation 418A while also transmitting the provisioned service information (as context data) to the context repository 108. The data processing systems 101 instantiates the new service(s) (in operation 420A) while the context repository stores (and/or updates) the context data for the infrastructure boundary 102 (in operation 420B).

In the event that the infrastructure orchestrator 105 determines, using the capability data and the context data, that the new service(s) cannot be provisioned for the infrastructure boundary, the infrastructure orchestrator 105 may notify a user (e.g., an administrator) of the management system 104 of the error and request human intervention by the user.

At operation 422, the data processing systems 101 transmit updated capability data (e.g., based on the instantiation of the new service(s) and any changes to existing infrastructures within the infrastructure boundary 102 as a result of the instantiation of the new service(s)) of the infrastructure to the observability and serviceability repository 110 where the updated capability data is stored (in operation 424).

Additionally, similar to the process described above in reference to FIG. 2A, the infrastructure manager 106 may (at any time and at any pre-determined interval) monitor the infrastructure boundary 102 for any changes to (namely, for any changes in the services running within) the infrastructure boundary 102. Such changes may be collected and reported to the context repository as updated context data. The infrastructure manager 106 may also determine, using the updated context data, that the capabilities of the infrastructure boundary 102 has changed. As a result, the infrastructure manager 106 may record this change in the capabilities of the infrastructure boundary 102 as updated capability data in the observability and serviceability repository 110.

As a result, the management system 104 (e.g., via the infrastructure orchestrator 105) will always have access to the most-up-to date capability data for the infrastructure boundary 102. Thus, when new service(s) are to be provisioned, provisioning of these services can advantageously be independent of statically defined operations (e.g., workflows) or hard-coded conditional logic. Adoption of these new service(s) can also advantageously be determined dynamically based on infrastructure changes to the infrastructure boundary 102.

Figure 5:
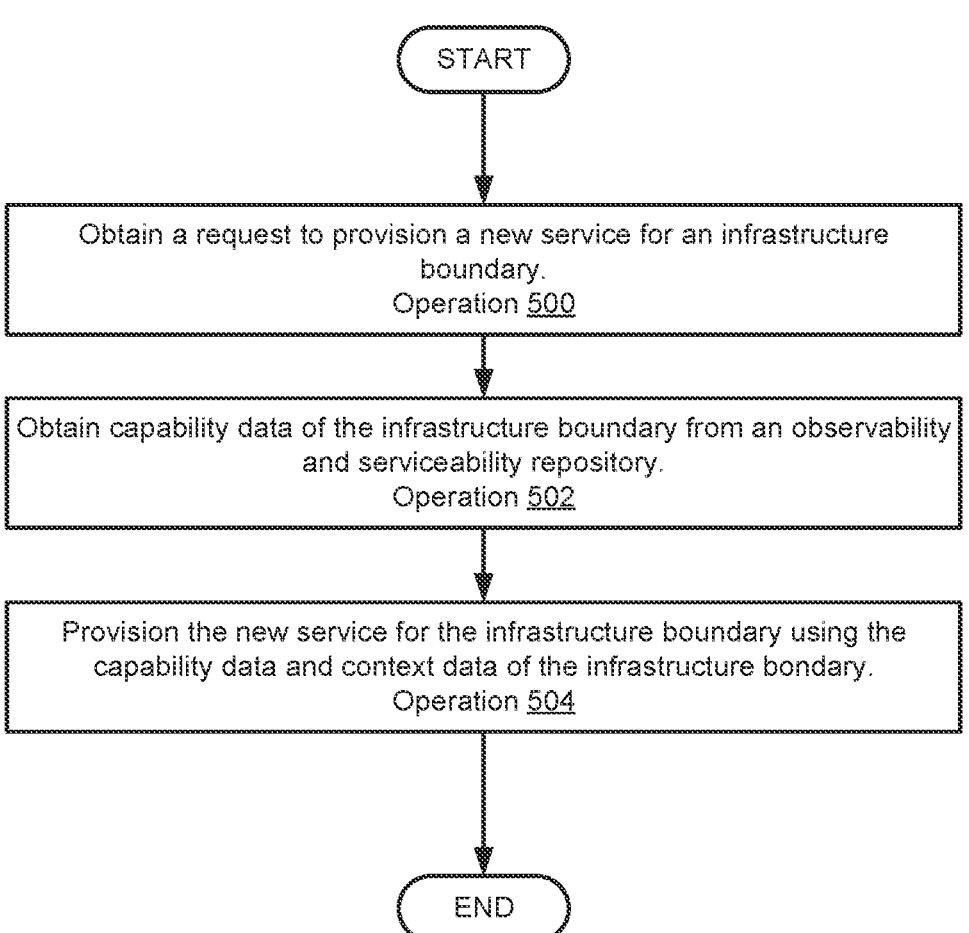
FIG. 5 shows a flowchart in accordance with one or more embodiments.

Turning to FIG. 5, FIG. 5 illustrates a flowchart associated with the service orchestration and management process, using context data and using capability data, of FIGS. 4A-4B. The operations (e.g., steps) in each of the flowchart of FIG. 5 may be performed by any combination of the devices/components shown in FIG. 1. Any operations described with respect to FIG. 5 may be performed in different, skipped, repeated, and/or be performed in a parallel or partially overlapping in time manner.

In operation 500, as discussed above in reference to FIG. 4A, a request to provision one or more new services for an infrastructure boundary is obtained. The request may be obtained from any source (e.g., an administrator of the management system, any of the data processing systems of the infrastructure boundary, a completely separate computing device connected to the communication network, etc.) and for any number of new services.

Although the request is associated above for the provisioning of new service(s), the request may also be for changing (e.g., updating, scaling, migrating, or the like) an existing service within the infrastructure boundary without departing from the scope of embodiments disclosed herein.

In operation 502, in response to obtaining the request in operation 500, the capability data of the infrastructure boundary is obtained from an observability and serviceability repository. The capability data may be obtained by a management system (namely, the infrastructure orchestrator of the management system).

In operation 504, the new service is provisioned (e.g., by the management system via the infrastructure orchestrator) for the infrastructure boundary using the capability data and context data associated with the infrastructure boundary obtained from a context repository. This advantageously allows the infrastructure orchestrator to determine whether and how (e.g., what changes need to be made to the behavior and service flow of the new and existing services for the infrastructure boundary) the new service(s) can be provisioned in the infrastructure boundary. As part of the provisioning, the infrastructure orchestrator transmits service provisioning instructions to the infrastructure boundary that causes the infrastructure boundary to provision the new service(s).

The method may end following operation 504.

Figure 6A:
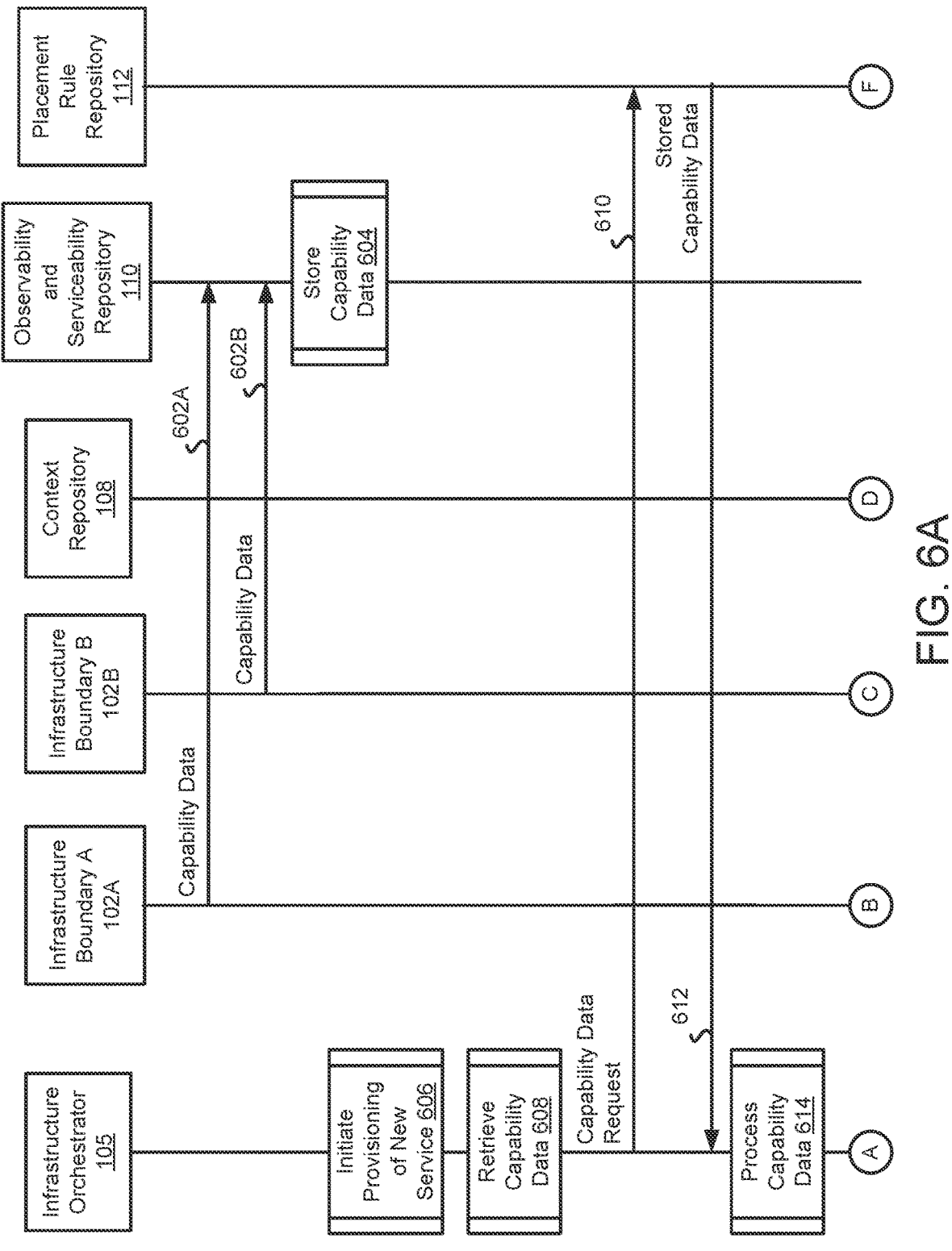
FIGS. 6A-6C show data flow diagrams in accordance with one or more embodiments.
Figure 6B:
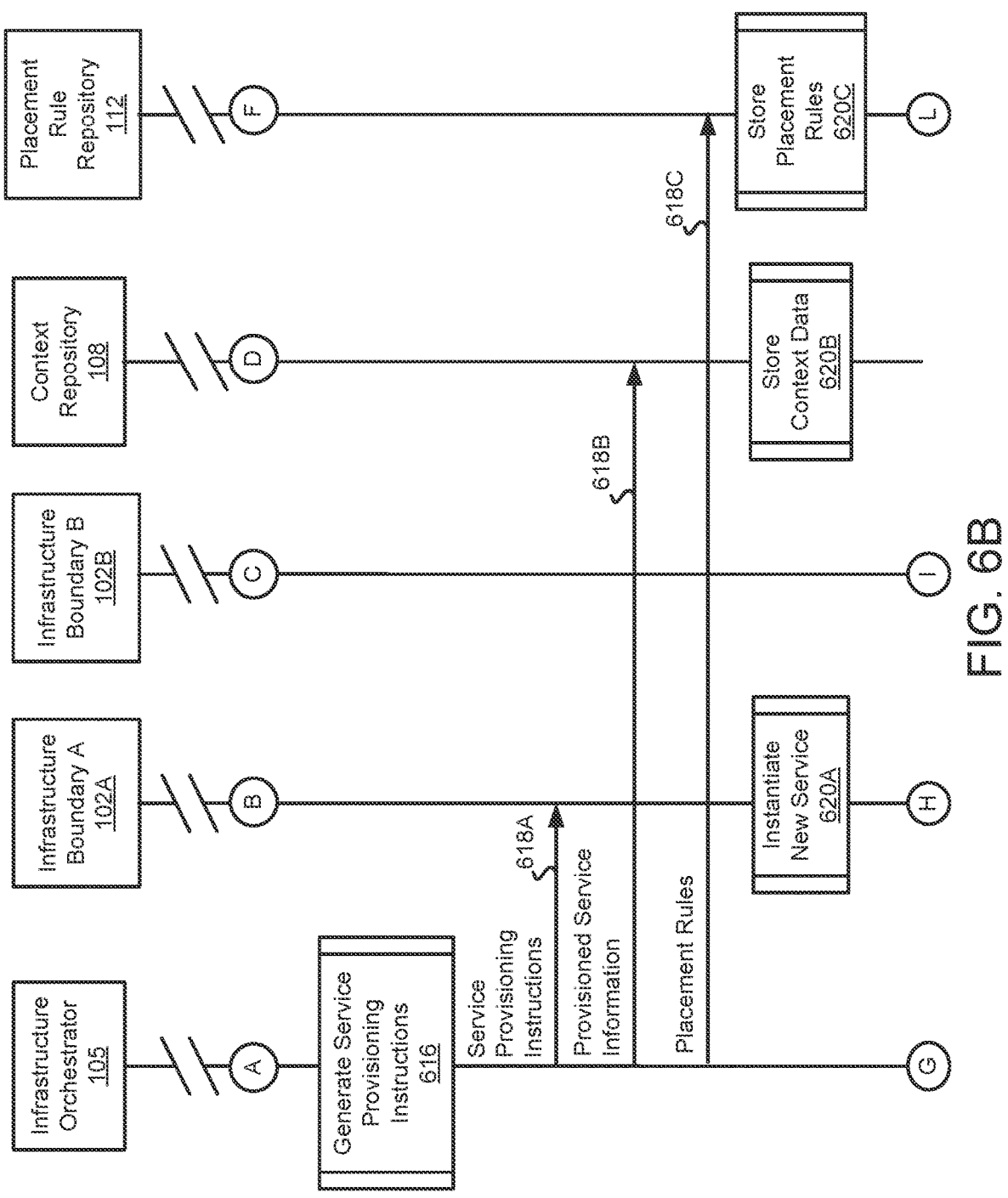

Turning now to FIGS. 6A-6B, FIGS. 6A-6B, a data flow diagram in accordance with one or more embodiments is shown. The data flow diagram may illustrate a service orchestration and management process (using context data, capability data, and placement rules) to be performed within a system similar to system 100 of FIG. 1. As discussed in FIG. 1, data processing systems 101 within an infrastructure boundary 102, management system 104 including infrastructure orchestrator 105 and infrastructure manager 106, context repository 108, observability and serviceability repository 110, placement rule repository 112, and workflow repository 114 may be connected to one another via communication system 120, allowing the systems and/or devices to communicate and exchange information with one another.

Starting with FIG. 6A, in operations 602A and 602B, capability data is transmitted from an infrastructure boundary A 102A and an infrastructure boundary B 102B to the observability and serviceability repository 110. Operations 604-614 (e.g., 604, 606, 608, 610, 612, 614) of FIG. 6A are substantially identical to operations 404-414 (e.g., 404, 406, 408, 410, 412, 414), respectively, discussed above in reference to FIG. 4A. In embodiments, the observability and serviceability repository 110 may store the capability data of each respective infrastructure boundary A and B in different partitions of storages making up the observability and serviceability repository 110.

Turning to FIG. 6B, operations 616, 618A, and 618B may be substantially similar to operations 416, 418A, and 418B, respectively, of FIG. 4B. In operation 616, placement rules may be additionally compiled by the infrastructure orchestrator based on the capability data and the context data of each of the infrastructure boundaries A and B.

The placement rules may include a set of rules and restrictions (e.g., placement rules) specifying where, how many, and what type of services can be provisioned within an infrastructure boundary. The placement rules may also include rules and restrictions associated with workload placement within an infrastructure boundary (and/or across one or more infrastructure boundaries) based on, but not limited to: resource availability, types of services to be implemented, affinity and anti-affinity requirements of existing and/or to be implemented services, fault-domain identification, or the like.

In operation 618C, the placement rules are transmitted (e.g., by the infrastructure orchestrator) to the placement rule repository 112 where the placement rules are stored in operation 620C. If placement rules already exist in placement rule repository 112, they are updated using the received placement rules.

As shown in FIG. 6B, the service provisioning instructions are transmitted (in operation 618A) only to infrastructure boundary A 102A. This could be a result of the determination by the infrastructure orchestrator (e.g., using the context data and capability data (and even any already existing placement rules) for each of the infrastructure boundaries A and B) that the new service(s) can only be provisioned in infrastructure boundary A (e.g., provisioning the new service(s) in infrastructure boundary B may cause negative effects such as overuse of the limited computing resources of infrastructure boundary B, which may disadvantageously cause a slow down in all processes executing within infrastructure boundary B).

In operation 620A, infrastructure boundary A instantiates the new service based on the service provisioning instructions. In operation 620B, the context data associated with the provisioning of the new services is stored in the context repository 108.

As another example of the new services (e.g., in operation 616) of FIG. 6B, assume that infrastructure boundary A is running two instances of a service called "Service A" and that infrastructure boundary B is also running two instances of "Service A". Now assume that a user wishes to further scale up Service A. Based on processing the context data and capability data (and any existing placement rules) of infrastructure boundaries A and B, the infrastructure orchestrator 105 may determine that neither of the infrastructure boundaries A and B are able to run another instance of Service A. As a result, the infrastructure orchestrator 105 may provision a completely new infrastructure boundary (e.g., infrastructure boundary C (not shown)) to run the additional instance of Service A.

Figure 6C:
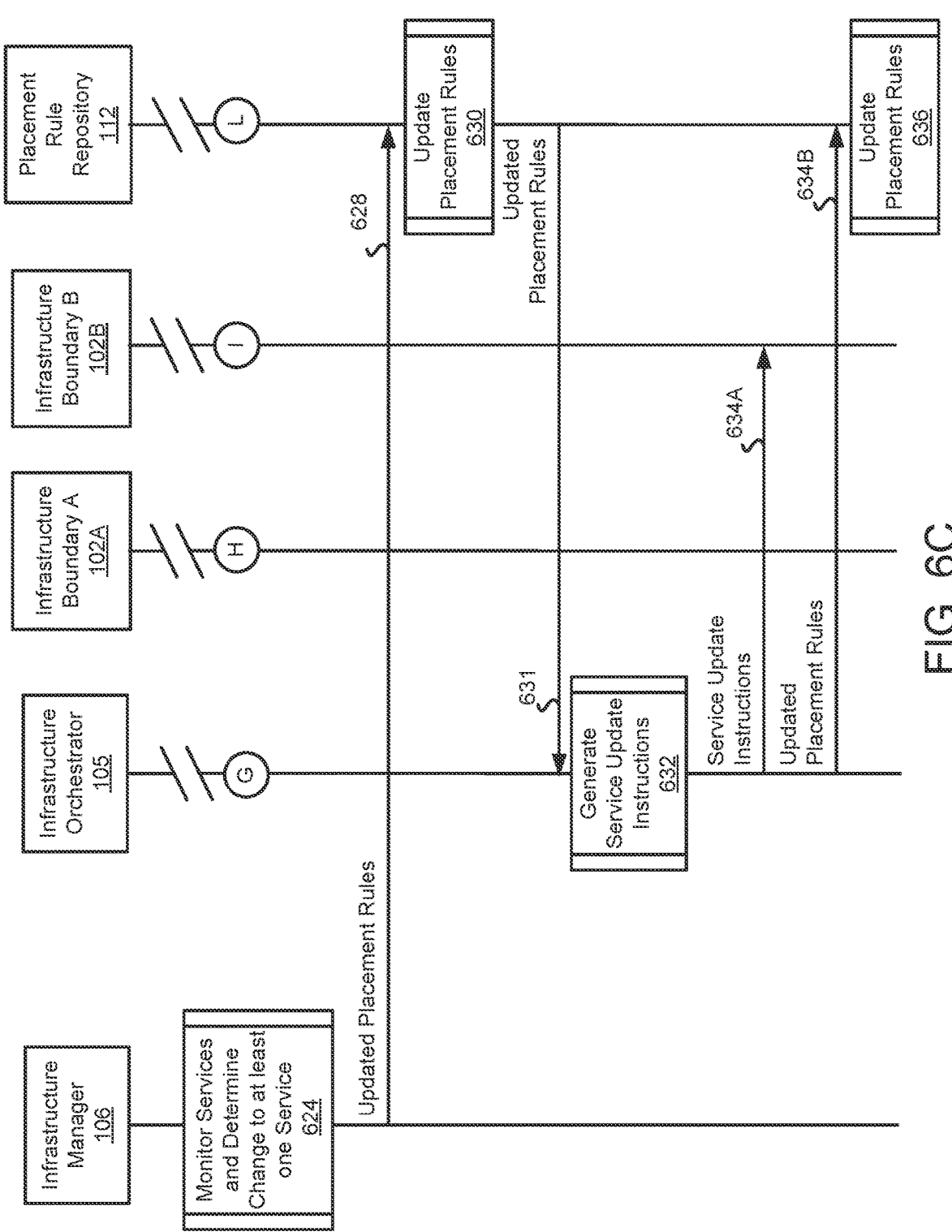

Turning now to FIG. 6C, at operation 624, the infrastructure manager 106 may monitor the services running in infrastructure boundary A and infrastructure boundary B and determine that there is a change to at least one service among these services. As discussed above in reference to FIG. 2A, the monitoring can be performed at any time and at any pre-defined interval. The monitoring may also be continuous.

In response to determining a change to at least one service, the infrastructure manager 106 may update the context repository (not shown) and the observability and serviceability repository (not shown) with new/updated context and capability data, respectively, associated with the change to the at least one service.

The infrastructure manager 106 may also, using the new/updated context data and capability data of the infrastructure boundaries A and B, generate a set of new/updated placement rules for each of the infrastructure boundaries A and B. This set of new/updated placement rules is transmitted (in operation 628) by the infrastructure manager 106 to the placement rule repository 112 where the set of new/updated placement rules is stored (in operation 630).

As a result of the placement rules in the placement rule repository 112 being updated, the infrastructure orchestrator may determine (using these the updated placement rules as obtained in operation 631) that one or more services in infrastructure boundaries A or B need to be updated (e.g., migrated, scaled out, etc.). If not updated, the change determined in operation 624 may affect infrastructure boundaries A or B in a negative manner (e.g., causing bottlenecks as services are scaled out without considering the capabilities of each infrastructure boundaries A or B, or the like).

In operation 632, the infrastructure orchestrator 105 may generate service update instructions for updating the services (e.g., terminating, migrating, scaling, de-scaling, etc.) running in infrastructure boundaries A and B. In the specific example shown in FIG. 6C, the service update instructions are transmitted to infrastructure boundary B in operation 634A where the instructions will be processed and applied by infrastructure boundary B.

In addition to transmitting the service update instructions to infrastructure boundary B, the infrastructure orchestrator may also transmit updated placement rules (e.g., generated based on the service update instructions along with the existing context and capability data of each infrastructure boundary A and B) to the placement rule repository 112 in operation 634B. In operation 636, The updated placement rules form the infrastructure manager 106 are stored in the placement rule repository 112.

The above configuration discussed in FIGS. 6A-6C, allows the system 100 of FIG. 1 to become even more versatile by combining an additional set of information (e.g., the placement rules) with the already existing context data and capability data. This results in a further improved system where statically defined operations (e.g., workflows) or hard-coded conditional logic can be fully eliminated.

Figure 7A:
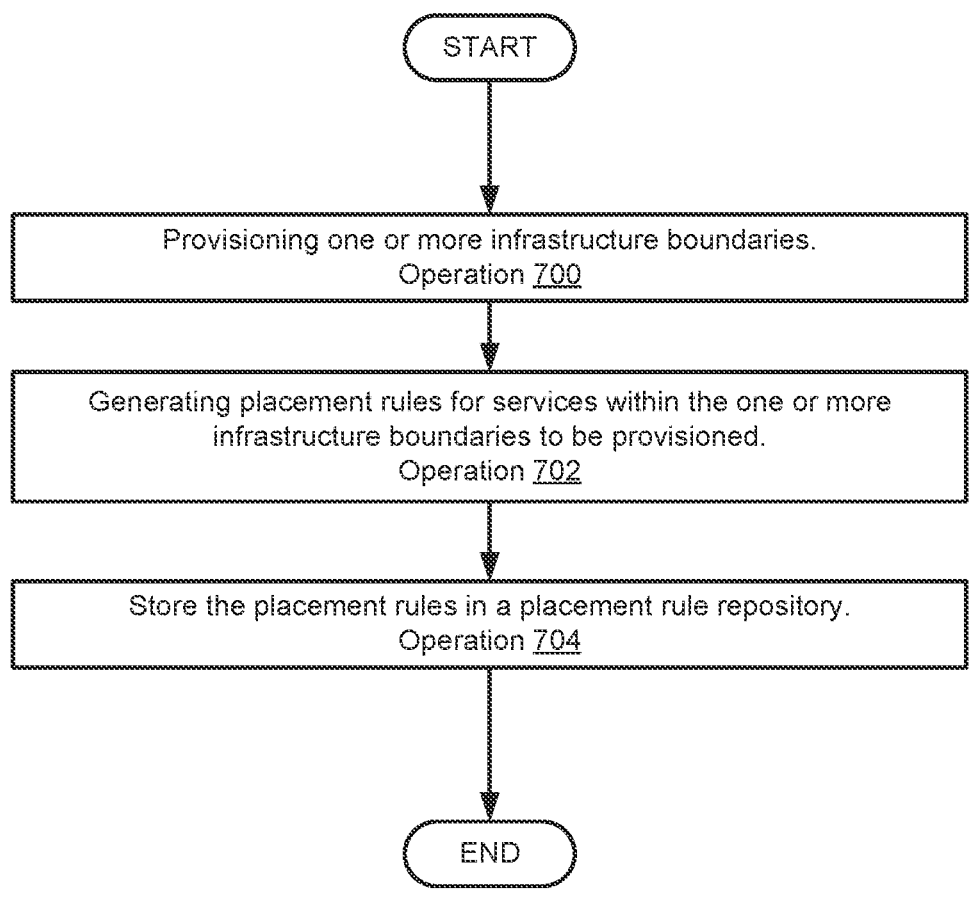
FIGS. 7A-7B show flowcharts in accordance with one or more embodiments.
Figure 7B:
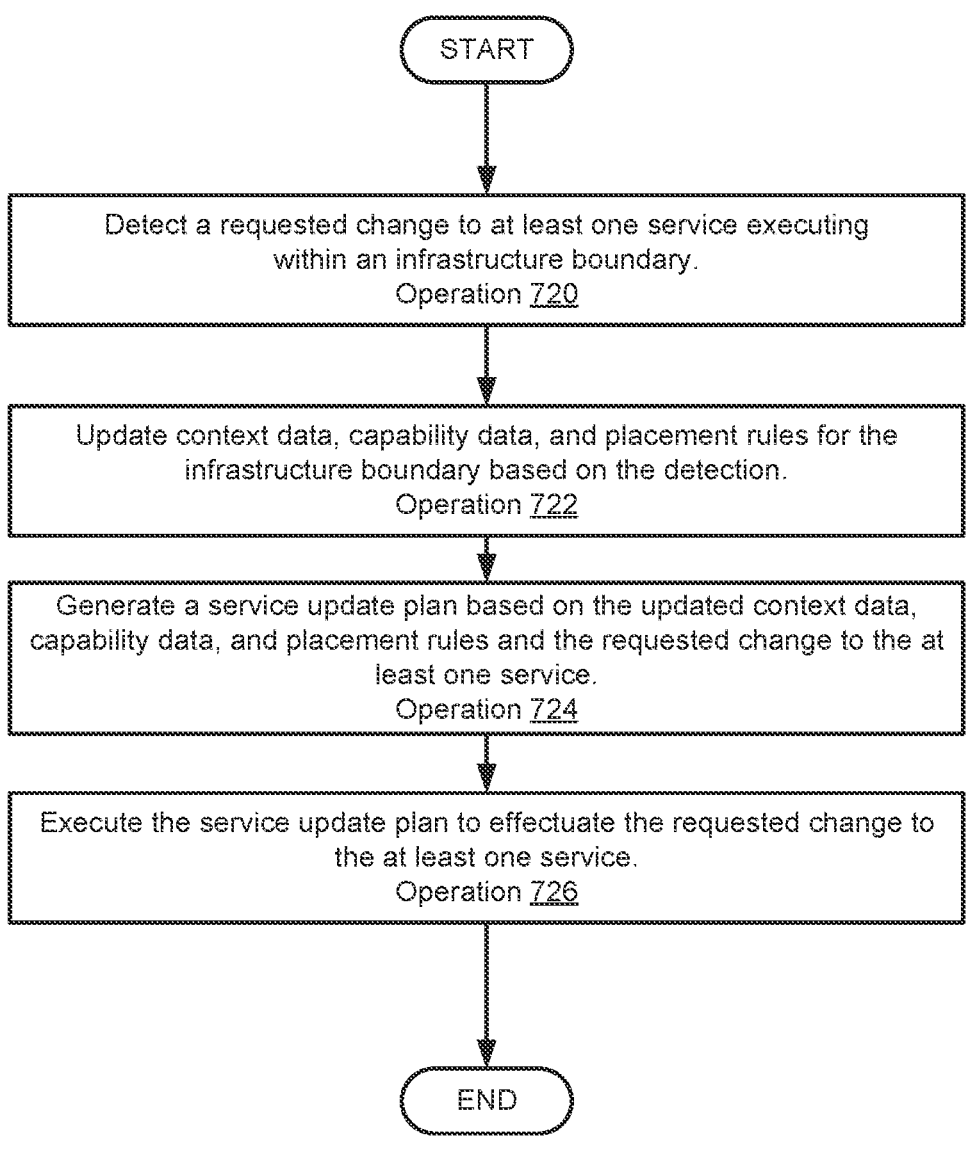

Turning to FIGS. 7A-7B, FIGS. 7A-7B illustrate flowcharts associated with the service orchestration and management process (using context data, capability data, and placement rules) of FIGS. 6A-6C. The operations (e.g., steps) in each of the flowcharts of FIGS. 7A-7B may be performed by any combination of the devices/components shown in FIG. 1. Any operations described with respect to FIGS. 7A-7B may be performed in different, skipped, repeated, and/or be performed in a parallel or partially overlapping in time manner.

Starting with FIG. 7A, in operation 700, one or more infrastructure boundaries are provisioned. This may be conducted (e.g., performed) by the infrastructure orchestrator of the management system when there are currently no existing infrastructure boundaries. Alternatively, this operation may be conducted (e.g., performed) by the infrastructure orchestrator of the management system when there are already existing infrastructure boundaries.

In embodiments, the provisioning of the infrastructure boundaries may be based on capability data of data processing systems to be grouped (e.g., delimited) into one of the infrastructure boundaries to be provisioned.

In operation 702, placement rules for services within the one or more infrastructure boundaries to be provisioned may be generated. These placement rules may be generated based on using the provisioning instructions as the initial context data for these infrastructure boundar(ies) to be provisioned and the capability data of data processing systems to be grouped (e.g., delimited) into one of the infrastructure boundaries to be provisioned.

In operation 704, the placement rules are stored (e.g., by the infrastructure orchestrator) into the placement rule repository. If there were no infrastructure boundaries existing prior to the provision in operation 700, these placement rules will be stored as the initial placement rules for the system (e.g., the system 100 of FIG. 1). Otherwise, any exiting placement rules may be updated (e.g., combined, replaced, etc.) using the placement rules generated in operation 702. In embodiments, as discussed above in reference to FIG. 6C, any changes (e.g., updates) to existing placement rules will cause the infrastructure orchestrator to determine whether any service updates are required to ensure that none of the existing infrastructure boundaries are negatively impacted by the provisioning of the new infrastructure boundaries.

The method may end following operation 704.

Turning now to FIG. 7B, in operation 720, the management system (e.g., via infrastructure manager) may detect a requested change (e.g., updating, scaling, migrating, terminating, etc.) to at least one service executing within an infrastructure boundary.

In operation 722, as discussed above in reference to FIGS. 6B-6C, the management system (e.g., via infrastructure orchestrator and/or infrastructure manager) update context data, capability data, and placement rules for the infrastructure boundary (and all other affected infrastructure boundaries) based on the requested change detected in operation 720.

In operation 724, and as discussed above in reference to FIGS. 6B-6C, the management system (e.g., via infrastructure orchestrator) may generate one or more service update plans based on the updated context data, capability data, and placement rules (along with the requested change to the at least one service).

In operation 726, as discussed above in reference to FIGS. 6B-6C, the management system (e.g., via the infrastructure orchestrator) executes the service update plan to effectuate the requested change to the at least one service. Executing the service update plan may cause changes not only to the at least one service but also to other existing services within a same infrastructure boundary (and may even cause changes to services (e.g., services dependent on the at least one service, services using the at least one service, or the like) executing in other infrastructure boundaries).

The method may end following operation 726.

Figure 8A:
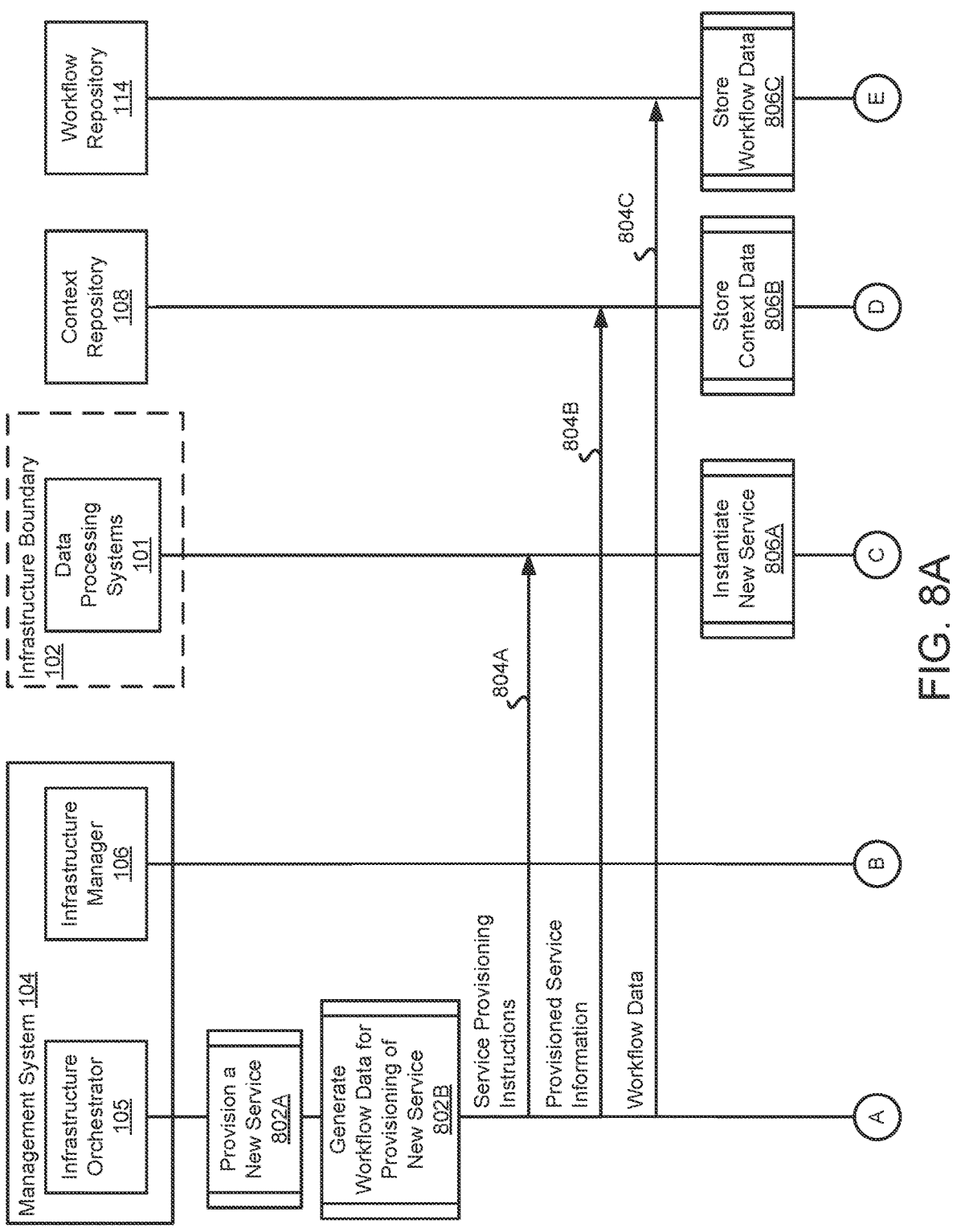
FIGS. 8A-8B show data flow diagrams in accordance with one or more embodiments.
Figure 8B:
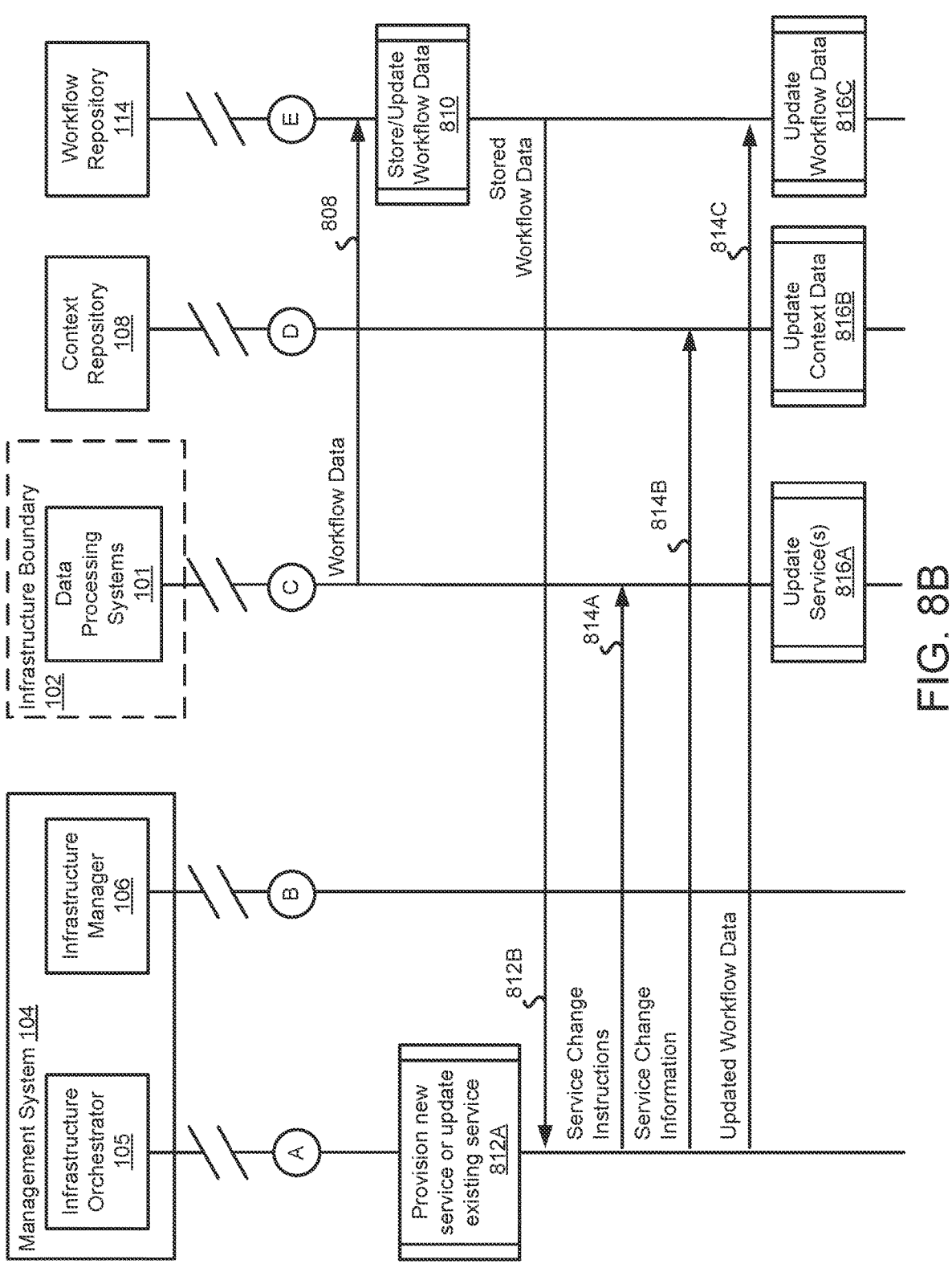

Turning now to FIGS. 8A-8B, FIGS. 8A-8B, a data flow diagram in accordance with one or more embodiments is shown. The data flow diagram may illustrate a service orchestration and management process (using context data, capability data, placement rules, and workflow data) to be performed within a system similar to system 100 of FIG. 1. As discussed in FIG. 1, data processing systems 101 within an infrastructure boundary 102, management system 104 including infrastructure orchestrator 105 and infrastructure manager 106, context repository 108, observability and serviceability repository 110, placement rule repository 112, and workflow repository 114 may be connected to one another via communication system 120, allowing the systems and/or devices to communicate and exchange information with one another.

Starting with FIG. 8A, at operation 802A, the infrastructure orchestrator 105 provisions a new service (e.g., similar to operation 202 of FIG. 2A). In conjunction with operation 802A, the infrastructure orchestrator 105 also (in operation 802B) generates workflow data for the provisioning of the new service.

The workflow data may specify one or more workflow composition and components (e.g., sequential steps, processes, procedures, devices, hardware and/or software components, or the like) implemented when a service, among services (e.g., services 103A-103N of FIG. 1), is first provisioned and/or subsequently changed (e.g., updated, terminated, scaled, migrated, or the like). Such workflow components (e.g., hardware and/or software components) may be self-describing and identify the composed rules and metadata that map to the context data (e.g., the context data is overlaid on the workflow component metadata for selection of the components to execute a workflow for implementing a service). The workflow data may be stored by the management system during the orchestration and management of the services of one or more of the infrastructure boundaries. Thew workflow data may also be stored by each service (e.g., via API calls, or other similar functions) of the services as the services change (e.g., are updated, terminated, scaled, migrated, or the like) over time.

In operation 804A, similar to operation 204A of FIG. 2A, the infrastructure orchestrator 105 transmits the service provisioning instructions to an infrastructure boundary 102 where the new service is instantiated (in operation 806A similar to operation 206A of FIG. 2A) by the infrastructure boundary 102.

In operation 804B, similar to operation 204B of FIG. 2A, the infrastructure orchestrator 105 transmits context data associated with the provisioning of the new service (as provisioned service information) to the context repository 108. In operation 806B, similar to operation 206B of FIG. 2A, the context repository 108 stores the context data associated with the provisioning of the new service.

In operation 804C, the infrastructure orchestrator 105 transmits the workflow data associated with the provisioning of the new service to the workflow repository 114. In operation 806C, the workflow repository stores the workflow data received from the infrastructure orchestrator 105.

Turning to FIG. 8B, assume that some time as passed since operation 806C. One or more services within the infrastructure boundary 102 has changed (e.g., been updated, terminated, scaled, migrated, etc.) by one or more users (e.g., administrators) of the data processing systems 101 of infrastructure boundary 102. In response to such changes to the service(s), the data processing systems 101 transmit workflow data associated with these changes (in operation 808) to the workflow repository 114. The workflow repository 114 stores/updates the new workflow data with existing workflow data (in operation 810).

In embodiments, changes to the workflow of the services running in the infrastructure boundary 102 may also be detected by the management system 104 (namely, the infrastructure manager 106 of the management system 104). Any changes to the workflow of the services running in the infrastructure boundary 102 detected by the management system 104 will also be recorded and reported (by the management system 104) to the workflow repository.

At any point after operation 810, infrastructure orchestrator 105 may determine (in operation 812A) that a new service should be provisioned for infrastructure boundary 102 and/or an existing service within infrastructure boundary 102 needs updating. In response, the infrastructure orchestrator 105 may retrieve (in operation 812B) stored workflow data from the workflow repository 114 and use the stored workflow data (along with existing context data of the infrastructure boundary 102 and/or new context data for the new or updated service) to generate service change instructions, service change information, and updated workflow data.

Using the stored workflow data advantageously allows the infrastructure orchestrator 105 to recycle (e.g., reuse) any existing workflows in the workflow data that are applicable to the current provisioning and/or update of service(s). As a result, the infrastructure orchestrator 105 need not generate/ determine a new set of workflows (and workflow components) and can use existing workflows (and workflow components) that are already shown to work.

In operation 814A, the infrastructure orchestrator 105 transmits the service change instructions to infrastructure boundary 102 where service update(s) are performed (in operation 816A) based on the service change instructions.

In operation 814B, the infrastructure orchestrator 105 transmits the service change information (as new/updated context data) to the context repository 108 where the new/ updated context data is stored (in operation 816B).

In operation 814C, the infrastructure orchestrator 105 transmits updated workflow data (including new/updated workflows in comparison to the workflow data obtained in operation 812A) to the workflow repository 114 where the updated workflow data is stored (in operation 816C).

Although not shown in FIGS. 8A-8B, data from the observability and serviceability repository 110 and placement rule repository 112 may also be used in conjunction with the workflow data and the context data without departing from the scope of embodiments disclosed herein.

Figure 9:
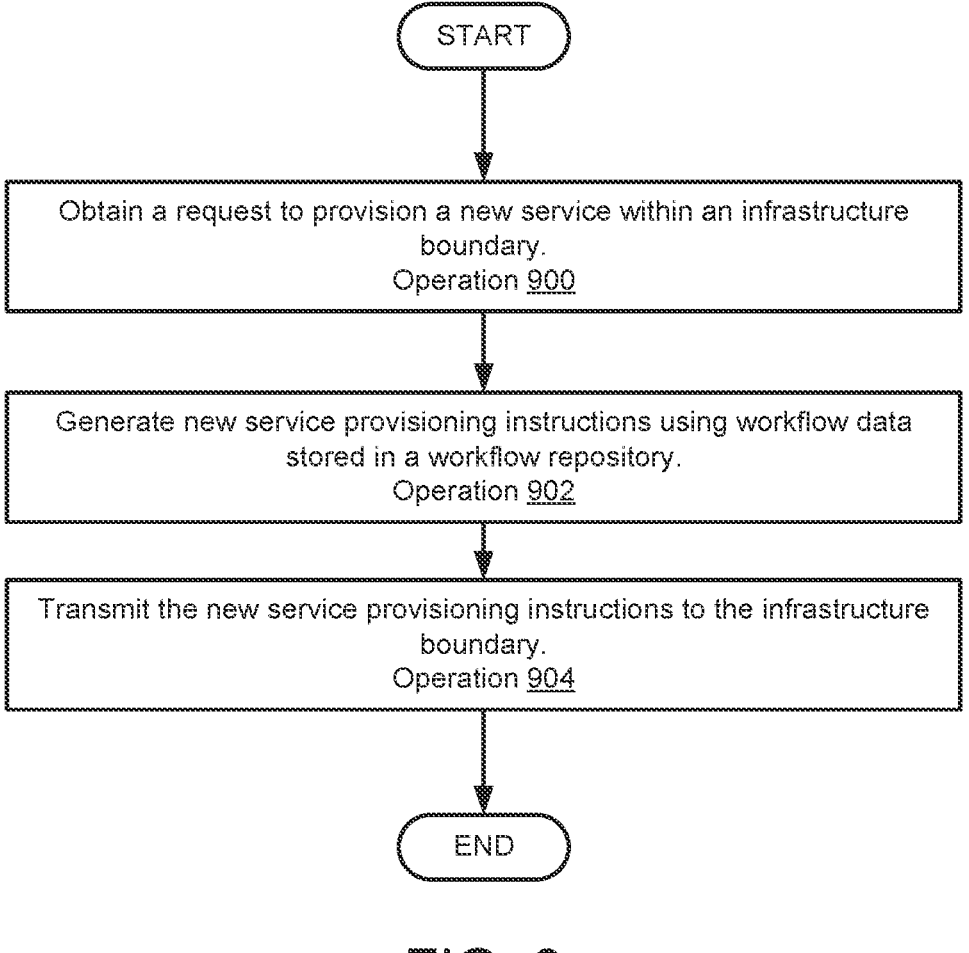
FIG. 9 shows a flowchart in accordance with one or more embodiments.

Turning now to FIG. 9, FIG. 9 illustrates a flowchart associated with the service orchestration and management process (using context data, capability data, placement rules, and workflow data), of FIGS. 8A-8B. The operations (e.g., steps) in each of the flowchart of FIG. 5 may be performed by any combination of the devices/components shown in FIG. 1. Any operations described with respect to FIG. 9 may be performed in different, skipped, repeated, and/or be performed in a parallel or partially overlapping in time manner.

In operation 900, a request to provision a new service within an infrastructure boundary may be obtained (e.g., by a management system; namely infrastructure orchestrator of the management system).

In operation 902, as discussed above in reference to FIG. 8B, new service provisioning instructions are generated using workflow data (associated with the infrastructure boundary) stored in a workflow repository. Context data, capability data, and placement rules associated with the infrastructure boundary may also be used in conjunction with the workflow data. A new/updated set of workflow data (for the infrastructure boundary) may also be generated using any combination of these data (e.g., the existing workflow data, context data, capability data, and placement rules).

In operation 904, as discussed above in reference to FIG. 8B, the new service provisioning instructions are transmitted to the infrastructure boundary for data processing systems delimited by the infrastructure boundary to execute in order to provision the new service. The new/updated set of workflow data (for the infrastructure boundary) may also be transmitted to be stored in the workflow repository.

The method may end following operation 904.

Figure 10:
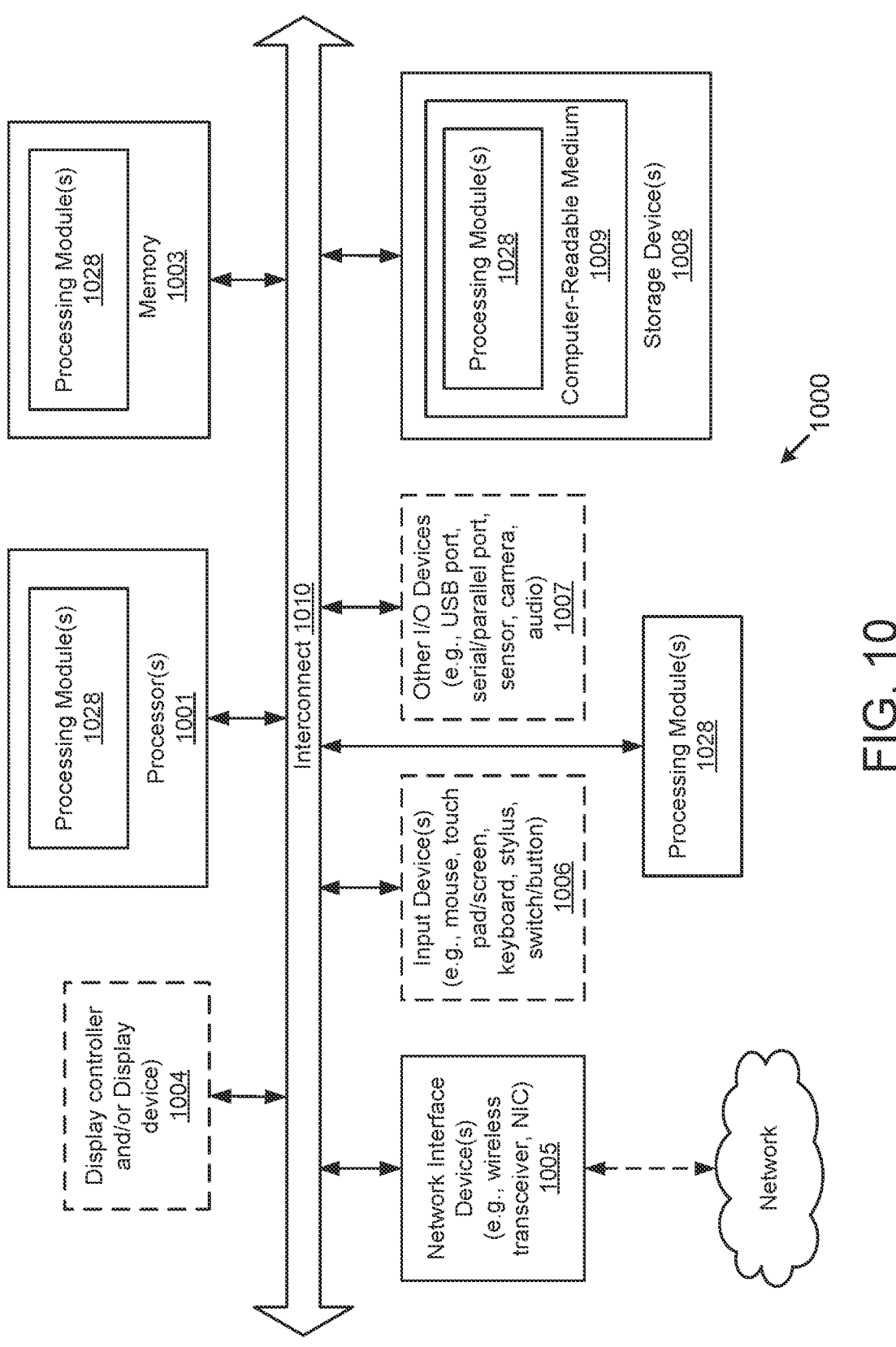
FIG. 10 shows a block diagram illustrating a data processing system in accordance with one or more embodiments.

Any of the components illustrated in FIGS. 1-9 may be implemented with one or more computing devices. Turning to FIG. 10, a block diagram illustrating an example of a data processing system (e.g., a computing device) in accordance with an embodiment is shown. For example, system 1000 may represent any of data processing systems described above performing any of the processes or methods described above. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1000 includes processor 1001, memory 1003, and devices 1005-1007 via a bus or an interconnect 1010. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra-low voltage processor, may act as a main processing unit and central hub for communication with the various components of the system. Such processor can be implemented as a system on chip (SoC).

Processor 1001 is configured to execute instructions for performing the operations discussed herein. System 1000 may further include a graphics interface that communicates with optional graphics subsystem 1004, which may include a display controller, a graphics processor, and/or a display device.

Processor 1001 may communicate with memory 1003, which in one embodiment can be implemented via multiple memory devices to provide for a given amount of system memory. Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include IO devices such as devices (e.g., 1005, 1006, 1007, 1008) including network interface device(s) 1005, optional input device(s) 1006, and other optional IO device(s) 1007. Network interface device(s) 1005 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1006 may include a mouse, a touch pad, a touch sensitive screen (which may be integrated with a display device of optional graphics subsystem 1004), a pointer device such as a stylus, and/or a keyboard (e.g., physical keyboard or a virtual keyboard displayed as part of a touch sensitive screen). For example, input device(s) 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1007 may include an audio device. An audio device may include a speaker and/or a microphone to facilitate voice-enabled functions, such as voice recognition, voice replication, digital recording, and/or telephony functions. Other IO devices 1007 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Storage device 1008 may include computer-readable storage medium 1009 (also known as a machine-readable storage medium or a computer-readable medium) on which is stored one or more sets of instructions or software (e.g., processing module, unit, and/or processing module/unit/logic 1028) embodying any one or more of the methodologies or functions described herein. Processing module/unit/logic 1028 may represent any of the components described above. Processing module/unit/logic 1028 may also reside, completely or at least partially, within memory 1003 and/or within processor 1001 during execution thereof by system 1000, memory 1003 and processor 1001 also constituting machine-accessible storage media. Processing module/unit/logic 1028 may further be transmitted or received over a network via network interface device(s) 1005.

Computer-readable storage medium 1009 may also be used to store some software functionalities described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 1028, components and other features described herein can be implemented as discrete hardware components or integrated in the functionality of hardware components such as ASICS, FPGAs, DSPs or similar devices. In addition, processing module/unit/logic 1028 can be implemented as firmware or functional circuitry within hardware devices. Further, processing module/unit/logic 1028 can be implemented in any combination hardware devices and software components.

Note that while system 1000 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing services provided by data processing systems using a management system, the method comprising:
 obtaining a request to provision a service for an infrastructure boundary containing one or more of the data processing systems;
 in response to obtaining the request, obtaining first workflow data stored in a workflow repository, wherein the first workflow data comprises a workflow previously implemented by other ones of the data processing systems associated with other infrastructure boundaries different from the infrastructure boundary to provision existing services running in the other infrastructure boundaries prior to the provisioning of the service by the infrastructure boundary;
 generating service provisioning instructions using the first workflow data; and
 transmitting the service provisioning instructions to the one or more of the data processing systems of the infrastructure boundary to cause the one or more of the data processing systems to initiate provisioning of the service.

2. The method of claim 1, further comprising:
 generating, based on the service provisioning instructions, second workflow data that comprises a first workflow to be implemented by the one or more of the data processing systems for the provisioning of the service; and
 storing the second workflow data in the workflow repository with the first workflow data.

3. The method of claim 2, wherein the first workflow data further comprises:
 second workflows previously implemented by the one or more of the data processing systems to provision existing services running in the infrastructure boundary prior to the provisioning of the service by the infrastructure boundary.

4. The method of claim 3, wherein the workflow comprises third workflows, and wherein generating the service provisioning instructions using the first workflow data comprises recycling at least one of the second workflows or at least one of the third workflows as the first workflow.

5. The method of claim 4, wherein the second workflow data includes information that indicates one or more workflow compositions implemented by the one or more of the data processing systems to provision the service and one or more workflow components used by the one or more of the data processing systems to provision the service, the one or more workflow components comprise hardware and software components available in the one or more of the data processing systems.

6. The method of claim 5, wherein the service provisioning instructions are further generated based on context data associated with the infrastructure boundary stored in a context repository, capability data associated with the infrastructure boundary stored in an observability and serviceability repository, and placement rules associated with the infrastructure boundary stored in a placement rule repository.

7. The method of claim 6, wherein the workflow repository, the context repository, the placement rule repository, and the observability and serviceability repository are all remote to the management system.

8. The method of claim 6, wherein the workflow repository, context repository, the placement rule repository, and the observability and serviceability repository are stored in the management system.

9. The method of claim 2, further comprising:

monitoring the service after the service is provisioned;

detecting, during the monitoring, that a change to the service has been made by the one or more of the data processing systems, the change to the service causing a change to the first workflow; and in response to the detecting, updating the workflow repository to include the change to the first workflow.

10. The method of claim 2, wherein generating the second workflow data comprises:

generating context data for the service to be provisioned, the context data being based on the service provisioning instructions; and overlaying the context data on workflow component metadata included in the first workflow.

11. A non-transitory machine-readable medium having instructions stored therein, which when executed by a processor, cause the processor to perform operations for managing services provided by data processing systems using a management system, the operations comprising:

obtaining a request to provision a service for an infrastructure boundary containing one or more of the data processing systems;

in response to obtaining the request, obtaining first workflow data stored in a workflow repository, wherein the first workflow data comprises a workflow previously implemented by other ones of the data processing systems associated with other infrastructure boundaries different from the infrastructure boundary to provision existing services running in the other infrastructure boundaries prior to the provisioning of the service by the infrastructure boundary;

generating service provisioning instructions using the first workflow data; and transmitting the service provisioning instructions to the one or more of the data processing systems of the infrastructure boundary to cause the one or more of the data processing systems to initiate provisioning of the service.

12. The non-transitory machine-readable medium of claim 11, wherein the operations further comprise:

generating, based on the service provisioning instructions, second workflow data that comprises a first workflow to be implemented by the one or more of the data processing systems for the provisioning of the service; and storing the second workflow data in the workflow repository with the first workflow data.

13. The non-transitory machine-readable medium of claim 12, wherein the first workflow data further comprises:

second workflows previously implemented by the one or more of the data processing systems to provision existing services running in the infrastructure boundary prior to the provisioning of the service by the infrastructure boundary.

14. The non-transitory machine-readable medium of claim 13, wherein the workflow comprises third workflows, and wherein generating the service provisioning instructions using the first workflow data comprises recycling at least one of the second workflows or at least one of the third workflows as the first workflow.

15. The non-transitory machine-readable medium of claim 14, wherein the second workflow data includes information that indicates one or more workflow compositions implemented by the one or more of the data processing systems to provision the service and one or more workflow components used by the one or more of the data processing systems to provision the service, the one or more workflow components comprise hardware and software components available in the one or more of the data processing systems.

16. A management system comprising:

a processor; and a memory coupled to the processor to store instructions, which when executed by the processor, cause the processor to perform operations for managing services provided by data processing systems using the management system, the operations comprising:

obtaining a request to provision a service for an infrastructure boundary containing one or more of the data processing systems;

in response to obtaining the request, obtaining first workflow data stored in a workflow repository, wherein the first workflow data comprises a workflow previously implemented by other ones of the data processing systems associated with other infrastructure boundaries different from the infrastructure boundary to provision existing services running in the other infrastructure boundaries prior to the provisioning of the service by the infrastructure boundary;

generating service provisioning instructions using the first workflow data; and transmitting the service provisioning instructions to the one or more of the data processing systems of the infrastructure boundary to cause the one or more of the data processing systems to initiate provisioning of the service.

17. The management system of claim 16, wherein the operations further comprise:

generating, based on the service provisioning instructions, second workflow data that comprises a first workflow to be implemented by the one or more of the data processing systems for the provisioning of the service; and storing the second workflow data in the workflow repository with the first workflow data.

18. The management system of claim 17, wherein the first workflow data further comprises:

second workflows previously implemented by the one or more of the data processing systems to provision existing services running in the infrastructure boundary prior to the provisioning of the service by the infrastructure boundary.

19. The management system of claim 18, wherein the workflow comprises third workflows, and wherein generating the service provisioning instructions using the first workflow data comprises recycling at least one of the second workflows or at least one of the third workflows as the first workflow.

20. The management system of claim 19, the second workflow data includes information that indicates one or more workflow compositions implemented by the one or more of the data processing systems to provision the service and one or more workflow components used by the one or more of the data processing systems to provision the service, the one or more workflow components comprise hardware and software components available in the one or more of the data processing systems.

* * * * *